US00RE48516E

(19) United States
(12) Reissued Patent
Tamamura et al.

(10) Patent Number: US RE48,516 E
(45) Date of Reissued Patent: Apr. 13, 2021

(54) CONNECTION TERMINAL, CONNECTION DEVICE, METHOD FOR MANUFACTURING THE DEVICE, MOTOR USING THE DEVICE, AND COMPRESSOR USING THE MOTOR AND BLOWER USING THE MOTOR

(71) Applicant: Panasonic Intellectual Property Management Co., Ltd., Osaka (JP)

(72) Inventors: Shuhei Tamamura, Shiga (JP); Kenji Kondo, Nara (JP)

(73) Assignee: Panasonic Intellectual Property Management Co., Ltd., Osaka (JP)

(21) Appl. No.: 15/711,759

(22) Filed: Sep. 21, 2017

Related U.S. Patent Documents

Reissue of:
(64) Patent No.: 9,214,741
Issued: Dec. 15, 2015
Appl. No.: 14/127,408
PCT Filed: May 9, 2013
PCT No.: PCT/JP2013/002974
§ 371 (c)(1),
(2) Date: Dec. 18, 2013
PCT Pub. No.: WO2014/181377
PCT Pub. Date: Nov. 13, 2014

(51) Int. Cl.
*H01R 4/2462* (2018.01)
*H01R 43/01* (2006.01)

(52) U.S. Cl.
CPC ..... *H01R 4/2462* (2013.01); *H01R 43/01* (2013.01); *Y10T 29/49174* (2015.01)

(58) Field of Classification Search
CPC ..... H01R 4/2462; H01R 43/01; H01R 4/245; H01R 4/62; H01R 13/04; H01R 13/405; H01R 39/32; H01R 13/00; Y10T 29/49174
See application file for complete search history.

(56) References Cited

U.S. PATENT DOCUMENTS 4,012,102 A * 3/1977 Cherney et al. ..... 439/404
6,341,978 B1 1/2002 Akeda ..... H01R 4/2466 439/397
2011/0117769 A1* 5/2011 Okamura ..... H01R 4/185 439/395

FOREIGN PATENT DOCUMENTS

JP 59-036172 3/1984
JP 59-036172 U 3/1984
JP 2001-143774 5/2001
JP 2009-283458 12/2009
JP 4550791 7/2010
JP 4550791 9/2010
(Continued)

OTHER PUBLICATIONS

Machine translation of JP 2011 192637. Jun. 18, 2015.*

*Primary Examiner* — Leonardo Andujar
(74) *Attorney, Agent, or Firm* — Hamre, Schumann, Mueller & Larson, P.C.

(57) ABSTRACT

Connection terminal (10) according to the present invention includes a tab part and not smaller than four pinching plates (12) that hold an aluminum electric wire. Pinching plates (12) each include first slit (13) and contact surfaces (14). First slit (13) has a first open end located in one side of the slit, and a first tip located in the other side. The aluminum electric wire is inserted into first slit (13). Contact surfaces (14) are in contact with the aluminum electric wire that is press-fitted into first slit (13). A contact area in which contact surfaces (14) are in contact with a core wire is an area of 100% to 200% of a radial cross-sectional area of the core wire.

6 Claims, 34 Drawing Sheets

(56) References Cited

FOREIGN PATENT DOCUMENTS

| | | |
|---|---|---|
| JP | 4790851 | 7/2011 |
| JP | 2011-192637 | 9/2011 |
| JP | 4790851 | 10/2011 |

* cited by examiner

CONNECTION TERMINAL, CONNECTION DEVICE, METHOD FOR MANUFACTURING THE DEVICE, MOTOR USING THE DEVICE, AND COMPRESSOR USING THE MOTOR AND BLOWER USING THE MOTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to connection terminals used for aluminum electric wires, connection devices including the connection terminals, methods for manufacturing the connection devices, motors using the connection devices, and compressors using the motors and blowers using the motors.

BACKGROUND ART

Conventionally, electrical apparatus such as transformers, reactors, and magnetrons have employed insulated electric wires made of aluminum as their core wires, in order to reduce weight of the electrical apparatus. Hereinafter, an insulated electric wire in which its core wire is made of aluminum and the outer peripheral surface of the core wire is coated with an insulating coating, is referred to as an aluminum electric wire. Aluminum has characteristics that it tends to suffer a deformation due to a creep phenomenon. Hereinafter, the deformation due to the creep phenomenon is referred to as the creep deformation. In the aluminum electric wire, its stress is relaxed when the creep deformation progresses. Hereinafter, such the relaxation of the stress caused by the creep deformation is referred to as the stress relaxation.

Concerning connections of aluminum electric wires, there have been proposals to address the creep deformation of aluminum, as shown in Patent Literatures 1 and 2.

In Patent Literature 1, a configuration is proposed in which a crimp terminal has a groove formed in a crimping part thereof, with the crimp terminal being connected to the aluminum electric wire. In Patent Literature 1, the formation of the groove is expected to address the creep deformation. Note that the crimp terminal referred in Patent Literature 1 corresponds to the connection terminal according to the present application.

In Patent Literature 2, the proposed connection terminal is such that a plurality of strain regions is formed in a plate-like part included in the connection terminal. The plate-like part is formed by folding a crimping part included in the connection terminal. In Patent Literature 2, the formation of the plurality of the strain regions is expected to address the creep deformation.

CITATION LIST

Patent Literatures

Patent Literature 1: Japanese Patent No. 4550791
Patent Literature 2: Japanese Patent Unexamined Publication No. 2011-192637

SUMMARY OF THE INVENTION

A connection terminal according to the present invention is used for an aluminum electric wire which includes a core wire and an insulating coating which covers the outer peripheral surface of the core wire. The connection terminal includes a tab part and not smaller than four pinching plates which hold the aluminum electric wire.

The pinching plates each include a first slit and contact surfaces. In the first slit, a first open end is located in one side of the slit while a first tip is located in the other side. Moreover, the aluminum electric wire is press-fitted into the first slit. The contact surfaces are in contact with the aluminum electric wire that is press-fitted into the first slit. The contact area, in which the contact surfaces are in contact with the core wire, is an area of 100% to 200% of the radial cross-sectional area of the core wire.

Moreover, a connection device according to the present invention is used for an aluminum electric wire that includes a core wire and an insulating coating that covers the outer peripheral surface of the core wire. The connection device includes a connection terminal and a holding part.

The connection terminal includes a tab part and not smaller than four of pinching plates which hold the aluminum electric wire. The holding part includes cavities into which the connection terminals are inserted.

The pinching plates each include a first slit and contact surfaces. In the first slit, a first open end is located in one side of the slit, while a first tip is located in the other side. Moreover, the aluminum electric wire is press-fitted into the first slit. The contact surfaces are in contact with the aluminum electric wire that is press-fitted into the first slit. The contact area, in which the contact surfaces are in contact with the core wire, is an area of 100% to 200% of the radial cross-sectional area of the core wire.

The cavity includes a wall surface and a second slit. The wall surface surrounds at least the pinching plates of the inserted connection terminal. The second slit is formed such that, in the wall surface, a second open end is located in one side of the slit while a second tip is located in the other side, at a location facing the first slit. In the second slit, the second open end is larger in a slit width than the second tip.

DESCRIPTION OF EMBODIMENTS

Figure 1:
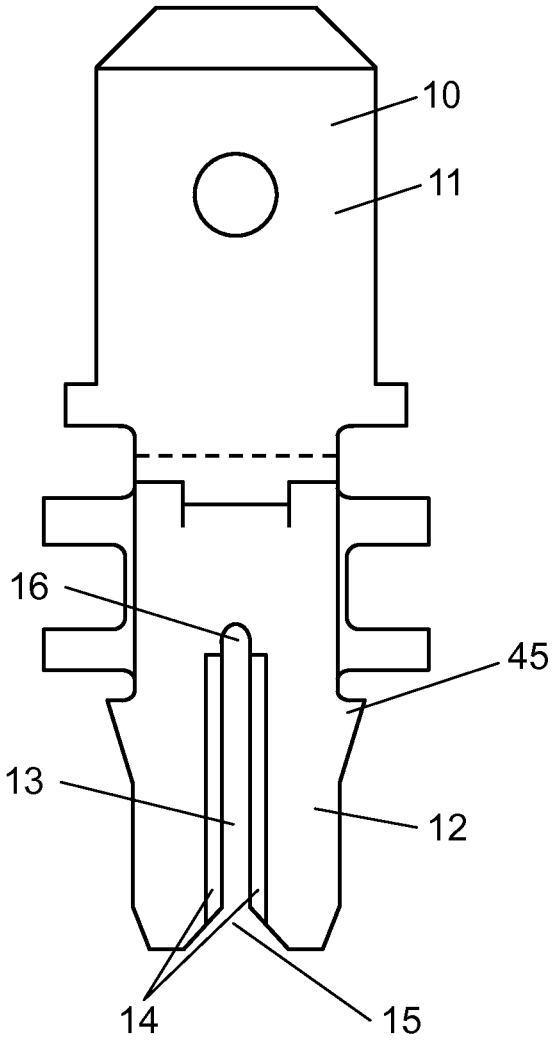
FIG. 1 is an elevational view of a connection terminal according to a first embodiment of the present invention.

The present invention is intended to suppress progress of a creep deformation in electrical apparatus that employs an aluminum electric wire, through the use of a connection terminal and a connection device including the connection terminal according to each of embodiments of the invention to be described later.

Moreover, the connection terminal according to the embodiment of the invention and the connection device including the connection terminal, can suppress a loss of stress on the connection terminal to hold the aluminum electric wire, with the loss resulting from the creep deformation.

Accordingly, the stress with which the connection terminal holds the aluminum electric wire is securely maintained.

As a result, the use of the connection device according to the embodiment of the present invention allows a highly reliable motor. The motor can be used in a compressor and a blower.

This means that conventional connection terminals involve the following subjects to be improved.

That is, according to Patent Literature 1, a specialized jig is needed for crimping a crimp terminal. In addition, in Patent Literature 1, an insulating cap is needed to cover a crimping part for securely maintaining the part's insulation to other conductive bodies.

Moreover, the crimp terminal described in Patent Literature 1 requires that the connected crimping part is fixed to be immobilized against vibrations. For example, in the case of a motor, the crimping part is fixed to such as a coil end part of a winding formed of the aluminum electric wire. The need for such the process leads to low productivity.

These reasons require additional manufacturing facilities, component counts, and working man-hours, in accordance with Patent Literature 1. In addition, these reasons become factors responsible for increased costs as well.

The connection terminal is also used in a motor for driving such as a compressor and a blower. The motor for driving the compressor is used in environments with strong vibrations and wildly-varying temperatures. When the motor, such as one used in the compressor, is used under particularly difficult conditions in terms of vibration and temperature variation, the creep deformation of the aluminum electric wire becomes easier to progress. This is because, when the fixation is made insufficiently between the connection terminal and a fixing member for fixing the connection terminal, the connection terminal will move relative to the fixing member. Accumulation of small movements is considered to help the creep deformation progress. The progress of the creep deformation causes a loss of stress on the connection terminal relative to the aluminum electric wire.

Under such the difficult conditions, when using the connection terminal described in Patent Literature 2, the creep deformation progresses to cause a stress relaxation. The occurrence of the stress relaxation between the aluminum electric wire and the connection terminal, results in a decrease in joint strength between the aluminum electric wire and the connection terminal. The decrease in the joint strength, in turn, increases contact resistance of the joining portion between the aluminum electric wire and the connection terminal. The increase in the contact resistance is thought to cause an unexpected malfunction such as a halt of operation of the electrical apparatus which uses the connection terminal. Consequently, reliability is low in the electrical apparatus in accordance with Patent Literature 2.

Accordingly, in the case where the aluminum electric wire is used in the motor for use in the compressor, blower, etc., a highly reliable connecting method which provides a connection capable of withstanding harsh service environments is desired for the connecting portion of the aluminum electric wire.

Hereinafter, descriptions will be made regarding a connection terminal exhibiting particularly outstanding advantages when used with an aluminum electric wire, and regarding a connection device including the connection terminal, with reference to the accompanying drawings.

In addition, a method for manufacturing the connection device will be described with reference to the drawings.

Moreover, descriptions will also be made regarding a motor using the connection device, a compressor using the motor, and a blower using the motor, with reference to the drawings.

Note, however, that each of the embodiments described hereinafter is one example of applications of the present invention, and does not set any limit to the technical scope of the present invention.

First Exemplary Embodiment

A connection terminal according to a first embodiment of the present invention will be described with reference to FIGS. 1 to 13.

Figure 2:
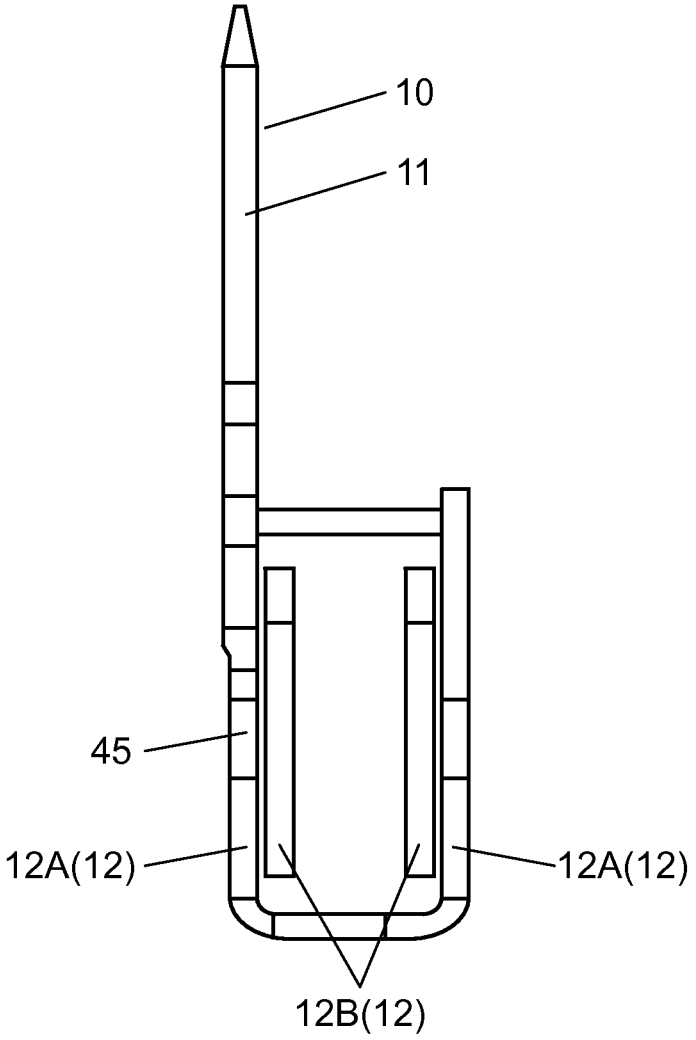
FIG. 2 is a side-elevational view of the connection terminal according to the first embodiment of the invention.
Figure 3:
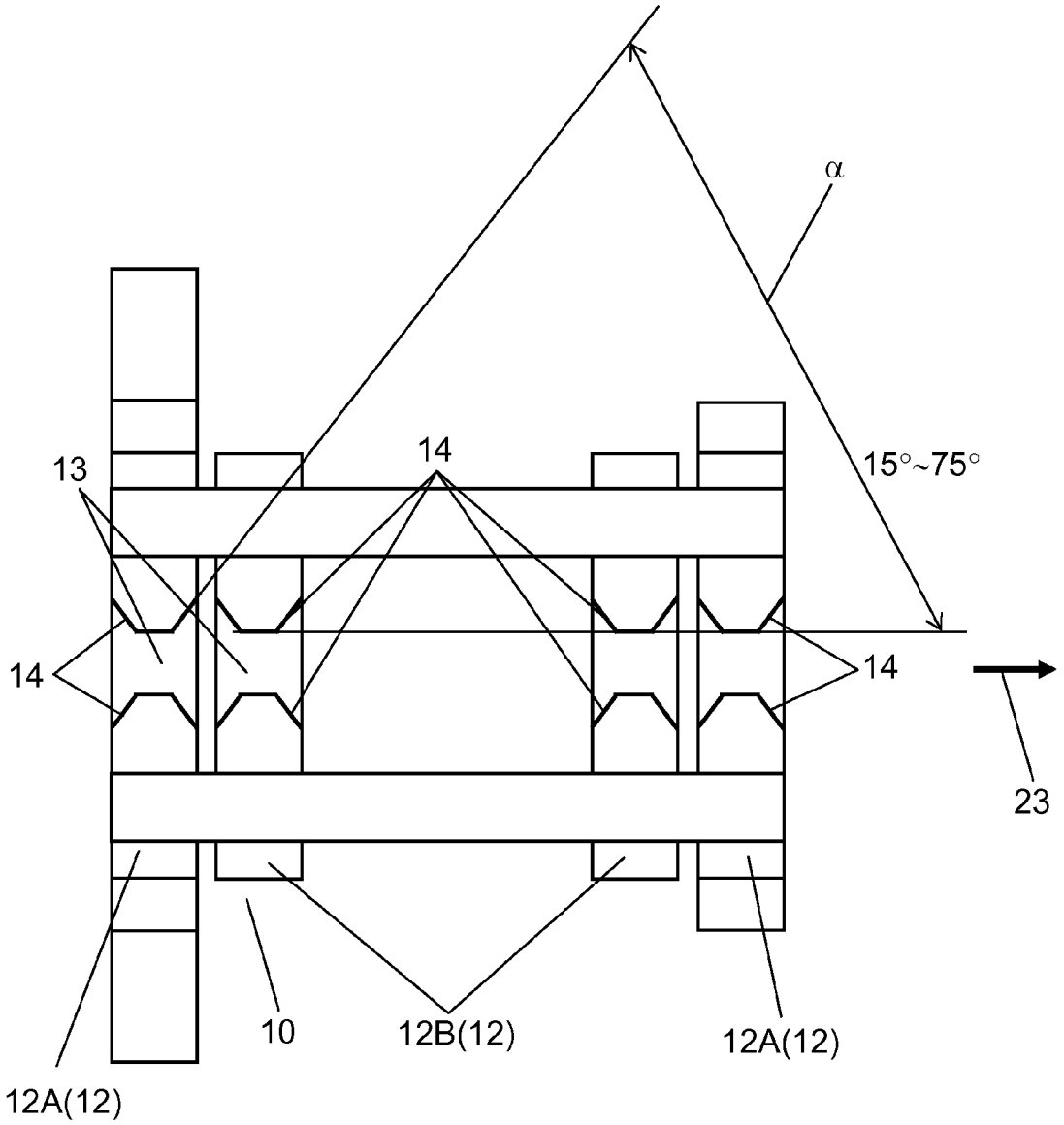
FIG. 3 is a bottom plan view of the connection terminal according to the first embodiment of the invention.

FIG. 1 is an elevational view of the connection terminal according to the first embodiment of the invention. FIG. 2 is a side-elevational view of the connection terminal according to the first embodiment of the invention. FIG. 3 is a bottom plan view of the connection terminal according to the first embodiment of the invention. Using FIGS. 1 to 3, an appearance of the connection terminal according to the first embodiment of the invention will be described.

Figure 4:
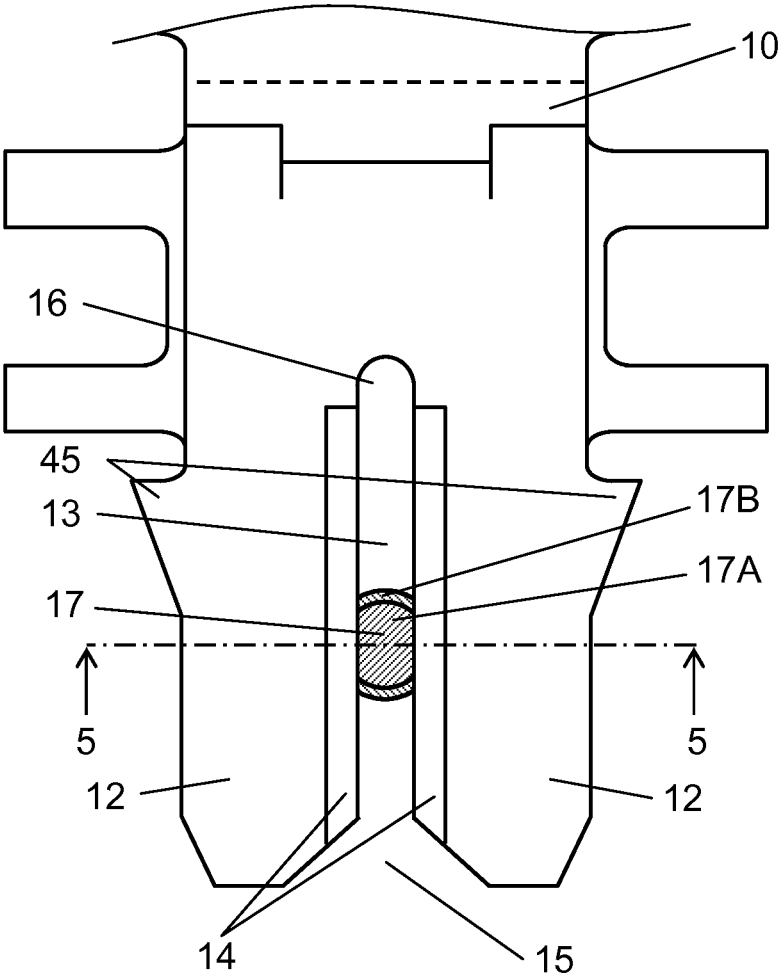
FIG. 4 is an enlarged view of a principal part of the connection terminal according to the first embodiment of the invention.
Figure 5:
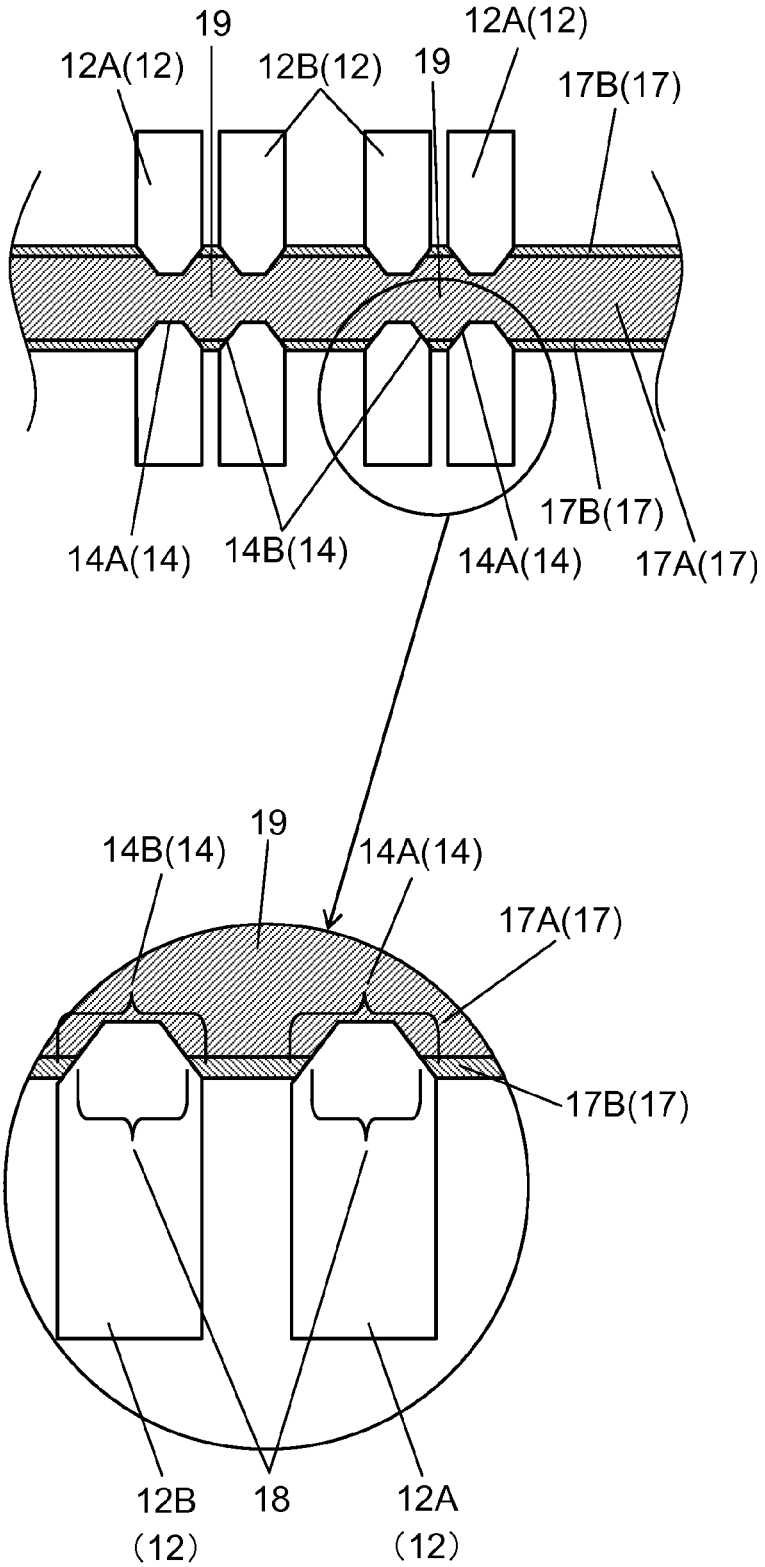
FIG. 5 is a cross-sectional view taken along line 5-5 in FIG. 4.

FIG. 4 is an enlarged view of a principal part of the connection terminal according to the first embodiment of the invention. FIG. 5 is a cross-sectional view taken along line 5-5 in FIG. 4. Using FIGS. 4 and 5, the principal part of the connection terminal according to the first embodiment of the invention will be described.

Figure 6:
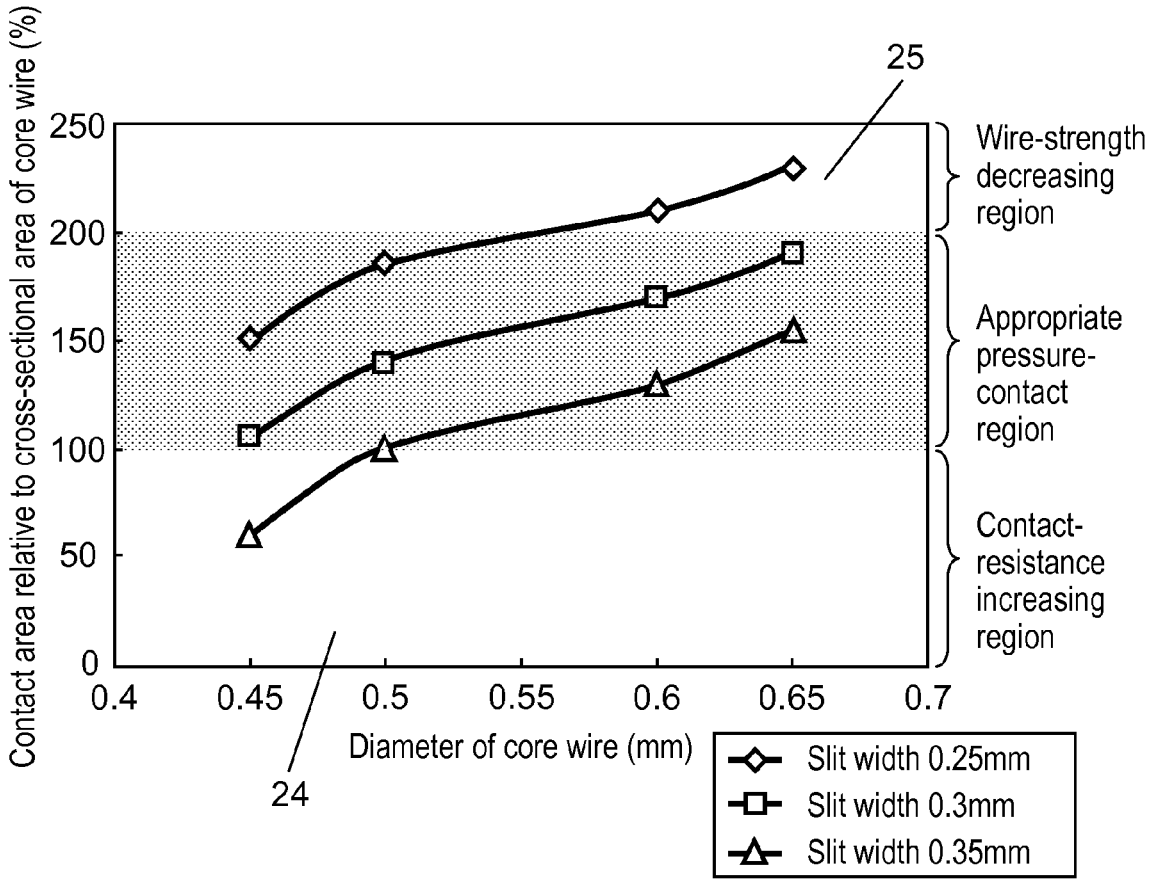
FIG. 6 is a characteristic graph illustrating a relation between a wire diameter of an aluminum electric wire and a ratio of a contact area to a cross-sectional area of a core wire, according to the first embodiment of the invention.

FIG. 6 is a characteristic graph illustrating a relation between a wire diameter of an aluminum electric wire and a ratio of a contact area to a cross-sectional area of a core wire, according to the first embodiment of the invention.

The connection terminal according to the first embodiment of the invention is used for the aluminum electric wire that includes the core wire and an insulating coating which covers the outer peripheral surface of the core wire.

As shown in FIGS. 1 to 3, connection terminal 10 according to the first embodiment of the invention includes tab part 11 and four of pinching plates 12 that hold the aluminum electric wire.

Each of pinching plates 12 includes first slit 13 and contact surfaces 14. First slit 13 has first open end 15 located in one side of the slit and first tip 16 located in the other side.

As shown in FIG. 4, aluminum electric wire 17 is press-fitted into first slit 13. Contact surfaces 14 are in contact with aluminum electric wire 17 press-fitted in first slit 13.

As shown in FIG. 5, the contact area between contact surfaces 14 and core wire 17A is an area of 100% to 200% of the radial cross-sectional area of core wire 17A. Note that the contact area as referred herein is a total area of effective contact surfaces 18 at which contact surfaces 14 are in contact, relative to the radial cross-sectional area of core wire 17A.

Further details of this are as follows.

As shown in FIGS. 1 to 3, connection terminal 10 can be formed with a copper alloy. A specific example of the copper alloy is MSP1 (MSP is a Registered Trade Mark), a CDA alloy manufactured by Mitsubishi Shindoh Co., Ltd.

Connection terminal 10 includes tab part 11. Into tab part 11, a corresponding flat connection terminal is fitted, as shown in a second embodiment and subsequent ones to be described later.

As shown in FIGS. 4 and 5, each of pinching plates 12 has contact surfaces 14 along first slit 13. When aluminum electric wire 17 is press-fitted into first slit 13, insulating coating 17B is removed by contact surfaces 14. Therefore, core wire 17A of aluminum electric wire 17 becomes in contact with contact surfaces 14. Pinching plates 12 are formed of outer pinching plates 12A forming the outer shell of connection terminal 10 and inner pinching plates 12B disposed in the inside of connection terminal 10. At contact points 19 where core wire 17A is in contact with contact surfaces 14, stresses are applied to core wire 17A from contact surfaces 14 in four directions. More specifically, as shown in FIG. 5, at each of contact points 19, the stresses are applied toward the contact point in the directions, from contact surfaces 14A included in outer pinching plate 12A and from contact surfaces 14B included in inner pinching plate 12B.

That is, the stresses are applied to core wire 17A from the four directions. Against these stresses, aluminum electric wire 17 generates reaction forces. The progress of the creep deformation can be suppressed when the stresses applied from contact surfaces 14 to aluminum electric wire 17 are moderately balanced with the reaction forces generated from aluminum electric wire 17 to contact surfaces 14. Hereinafter, the stresses applied to core wire 17A from the four directions are referred to as the internal stresses.

FIG. 6 shows the wire diameter of the core wire and a ratio, to the core wire, of the contact area in which the contact surfaces are in contact with the core wire.

As shown in FIG. 6, when the contact area is smaller than 100%, the connection terminal is unable to maintain the internal stresses. When the internal stresses cannot be maintained, the creep deformation of the aluminum electric wire becomes easy to progress. Therefore, the joint strength decreases between the aluminum electric wire and the connection terminal. The decrease in the joint strength increases the contact resistance of the joining portion between the aluminum electric wire and the connection terminal. When the contact resistance increases to exceed an allowable value, a poor electrical connection occurs. This region is referred to as contact-resistance increasing region 24.

On the other hand, when the contact area is larger than 200%, the strength of the aluminum electric wire decreases. That is, when the aluminum electric wire is press-fitted into the first slit, the core wire is deformed by the contact surfaces. As a result of the deformation of the core wire, the radial cross-sectional area of the core wire becomes small. The decrease in the radial cross-sectional area of the core wire decreases the wire strength of the aluminum electric wire. An excessive decrease in the wire strength of the aluminum electric wire sometimes results in a broken wire. This region is referred to as wire-strength decreasing region 25.

As can be seen from the above description, in accordance with the connection terminal according to the first embodiment of the present invention, the stresses are applied to the core wire from the contact surfaces in the four directions at the contact points where the core wire is in contact with the contact surfaces. Against the stresses, the reaction forces are generated from the core wire to the contact surfaces. When the stresses and the reaction forces are moderately in valance, the progress of the creep deformation can be suppressed even under difficult conditions. This allows the internal stresses to be maintained.

When the contact area is in the range from 100% to 200% of the radial cross-sectional area of the core wire, it is possible to maintain the state where the stresses and the reaction forces are moderately in valance. Therefore, the progress of the creep deformation can be suppressed, which thereby maintains the wire strength of the press-fitted aluminum electric wire.

Note, however, that the number of the pinching plates may be not smaller than four.

Figure 7:
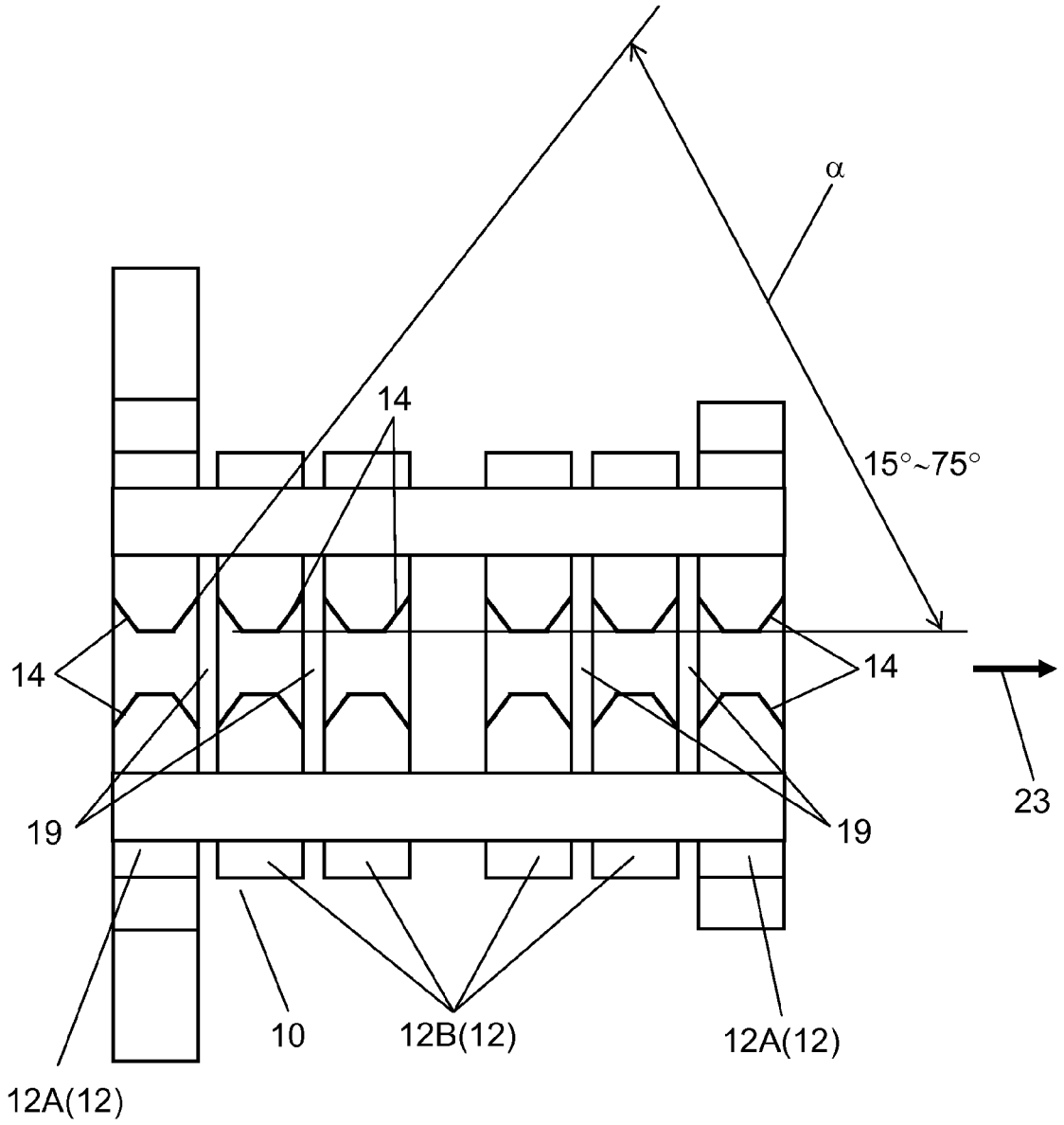
FIG. 7 is a bottom plan view of another connection terminal according to the first embodiment of the invention.

For example, as shown in FIG. 7, when six of the pinching plates 12 are used, each of the plates generates the internal stresses to the corresponding contact point 19. Also in this case, similar functional advantages can be expected as long as the contact area is in the range from 100% to 200%.

Next, configurations to obtain the contact area ranging 100% to 200% will be described.

Figure 8:
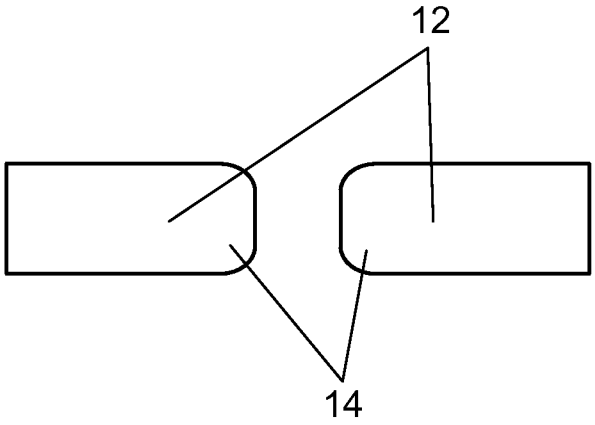
FIG. 8 is a bottom plan view of another pinching plate included in the connection terminal according to the first embodiment of the invention.
Figure 9:
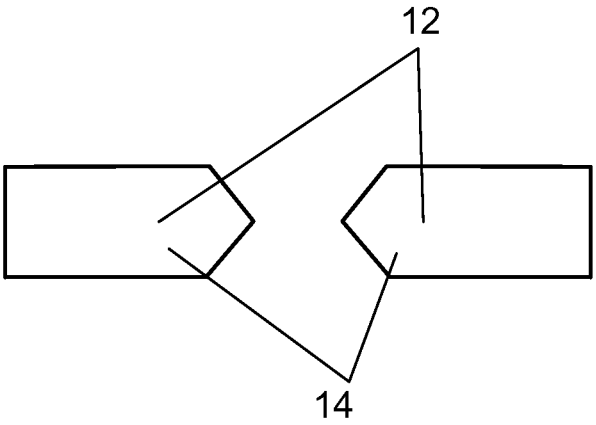
FIG. 9 is a bottom plan view of further another pinching plate included in the connection terminal according to the first embodiment of the invention.

FIG. 7 is a bottom plan view of another connection terminal according to the first embodiment of the present invention. FIG. 8 is a bottom plan view of another pinching plate included in the connection terminal according to the first embodiment of the invention. FIG. 9 is a bottom plan view of further another pinching plate included in the connection terminal according to the first embodiment of the invention. Using FIGS. 7 to 9, another embodiment will be described of the connection terminal according to the first embodiment of the invention.

In addition to the shape described above, the connection terminal according to the first embodiment of the invention is such that each of the contact surfaces has an angle of inclination ranging 15° to 75° relative to the direction in which the not smaller than four pinching plates are arranged.

Further details of this are as follows.

As shown in FIGS. 3 and 5, in connection terminal 10, four pinching plates 12 are sequentially arranged along the axial direction of the aluminum electric wire to be press-fitted. In FIG. 3, the direction indicated by the arrow is referred to as direction 23 in which the pinching plates are arranged.

Each of contact surfaces 14 has an inclination angle a ranging 15° to 75° relative to direction 23 in which the pinching plates are arranged.

Table 1 shows the degree of variations in contact resistance which occurs between the aluminum electric wire and the contact surfaces, before and after a thermal shock test.

TABLE 1

Variations in contact resistance after a thermal shock test with respect to inclination angle a of the contact surfaces

| | Inclination angle α | | | | | | |
|---|---|---|---|---|---|---|---|
| | 0° | 15° | 30° | 45° | 60° | 75° | 90° |
| Presence/absence of variations | X | ○ | ○ | ○ | ○ | ○ | X |

○: absence of variations
X: presence of variations

The thermal shock test was carried out with the following conditions. The ambient temperature was varied from −40° C. to 120° C. One cycle consisted of states, i.e. the state where the ambient temperature of −40° C. was kept for 30 minutes and the state where the ambient temperature of 120° C. was kept for 30 minutes. The cycle was repeated 1000 times, i.e. 1000 cycles. Incidentally, these conditions are for an accelerated test to determine whether or not a compressor, shown in a fourth embodiment to be described later, can withstand practical use.

Before and after the thermal shock test, when the variations in the contact resistance were observed within 1 mΩ, the contact resistance is determined to be in "absence of variations." On the other hand, when the variations in the contact resistance observed exceeds 1 mΩ, the contact resistance is determined to be in "presence of variations."

As shown in Table 1, when inclination angle α is smaller than 15°, the result after the thermal shock test has shown that the contact resistance exhibits the variations. The reason of this is considered that the internal stresses cannot be maintained in the radial direction of the aluminum electric wire. That is, in the aluminum electric wire, the stress relaxation occurs due to the progress of the creep deformation. The occurrence of the stress relaxation increases the contact resistance between the aluminum electric wire and the connection terminal. The contact resistance increases to exceed the allowable value, resulting in the poor electrical connection.

On the other hand, when inclination angle α is larger than 75°, it is considered that the internal stresses cannot be maintained in the radial direction of the aluminum electric wire in the early stage of the thermal shock test. That is, in the aluminum electric wire, the stress relaxation occurs due to the progress of the creep deformation. The occurrence of the stress relaxation increases the contact resistance between the aluminum electric wire and the connection terminal. The contact resistance increases to exceed the allowable value, resulting in the poor electrical connection.

Note, however, that similar functional advantages can be expected even when pinching plates 12 have other cross-sectional shapes in direction 23 in which the plates are arranged, including a curved shape as shown in FIGS. 8 and 9.

Next, a case of the embodiment in which a plurality of the aluminum electric wires is press-fitted into the connection terminal will be described.

Figure 10:
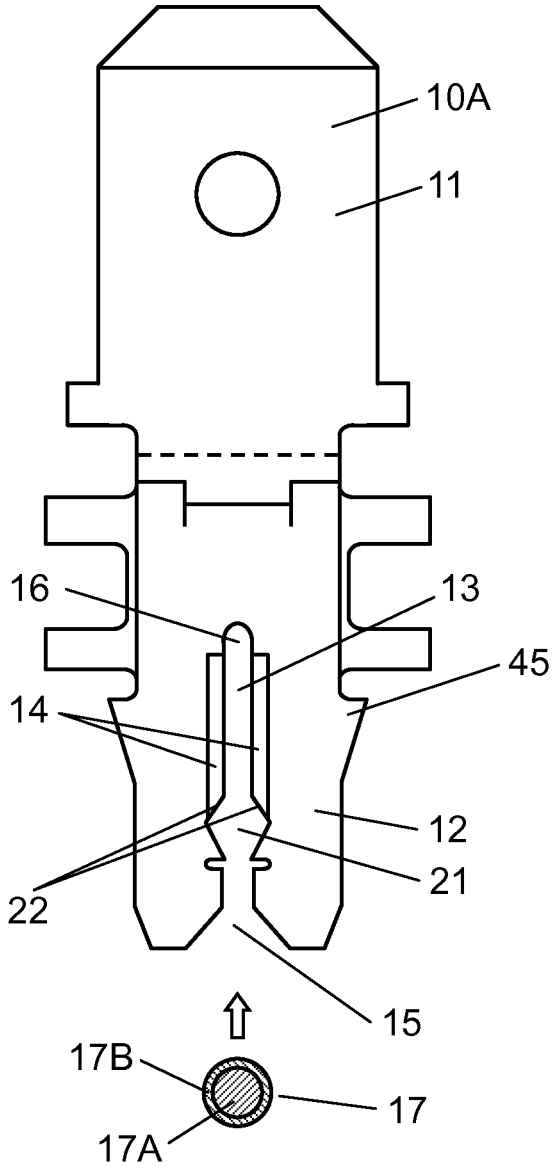
FIG. 10 is an illustrative view of an operation in which an aluminum electric wire is press-fitted into another connection terminal, according to the first embodiment of the invention.
Figure 11:
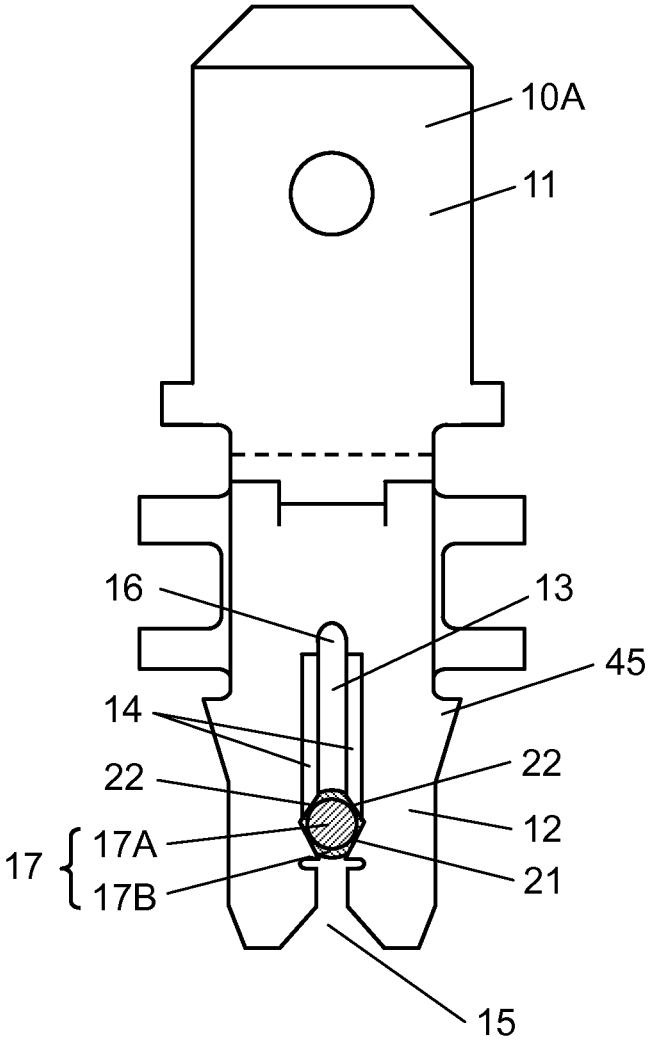
FIG. 11 is an illustrative view of the operation in which the aluminum electric wire is press-fitted into the another connection terminal, according to the first embodiment of the invention.
Figure 12:
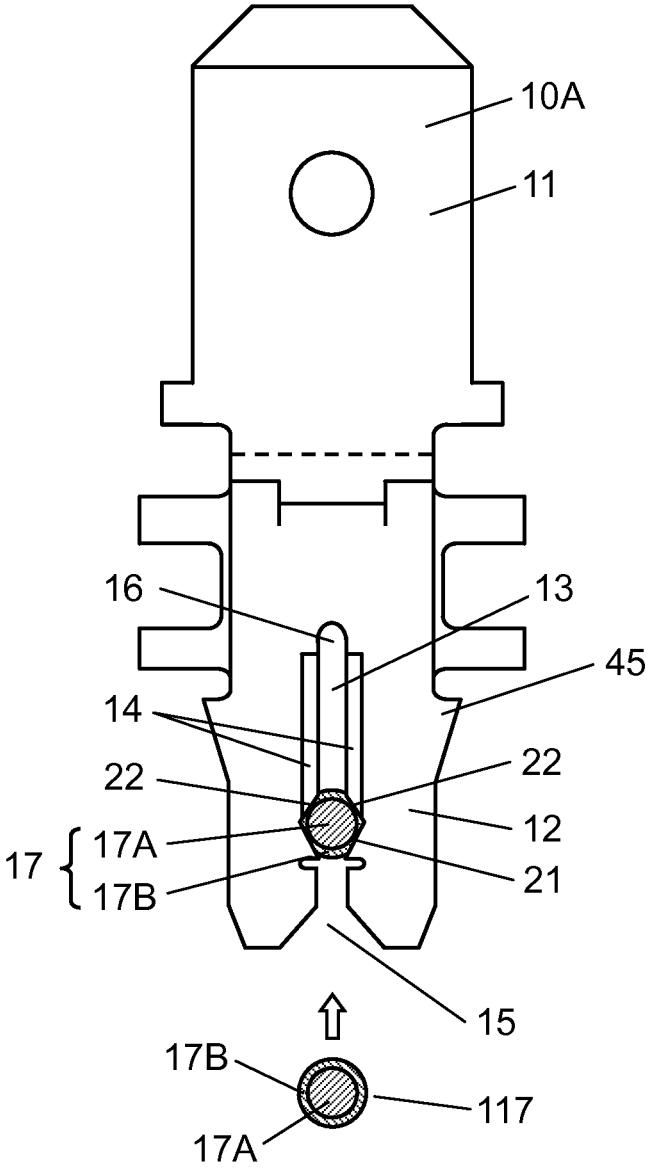
FIG. 12 is an illustrative view of an operation in which an aluminum electric wire is press-fitted into the another connection terminal, according to the first embodiment of the invention.
Figure 13:
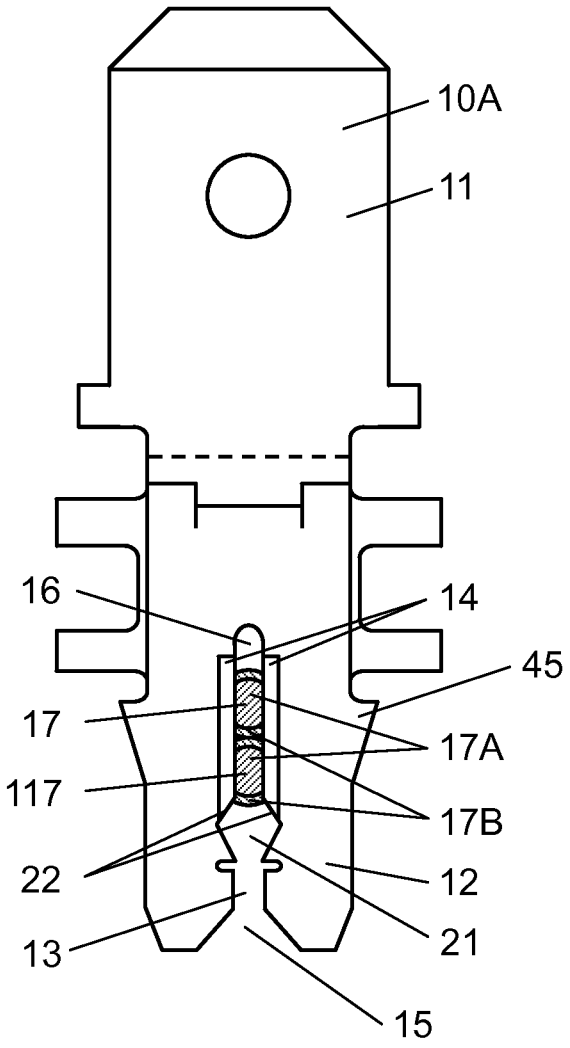
FIG. 13 is an illustrative view of the operation in which the aluminum electric wire is press-fitted into the another connection terminal, according to the first embodiment of the invention.

FIG. 10 is an illustrative view of an operation in which the aluminum electric wire is press-fitted into another connection terminal according to the first embodiment of the invention. FIG. 11 is an illustrative view of the operation in which the aluminum electric wire is press-fitted into the another connection terminal according to the first embodiment of the invention. FIG. 12 is an illustrative view of an operation in which an aluminum electric wire is press-fitted into the another connection terminal according to the first embodiment of the invention. FIG. 13 is an illustrative view of the operation in which the aluminum electric wire is press-fitted into the another connection terminal according to the first embodiment of the invention.

Using FIGS. 10 to 13, the operations will be described in which the aluminum electric wires are press-fitted into the another connection terminal according to the first embodiment of the invention.

In addition to the shape described above, the connection terminal according to the first embodiment is such that the first slit has a temporarily holding part where the aluminum electric wire is temporarily held when the aluminum electric wire is press-fitted.

Further details of this are as follows.

As shown in FIG. 10, in connection terminal 10A, temporarily holding part 21 is disposed in the vicinity of first open end 15. Temporarily holding part 21 is preferably located, in first slit 13, closer to first open end 15 than to first tip 16. It is only required for temporarily holding part 21 to have a width to the extent to which the press-fitted aluminum electric wire can be held. Temporarily holding part 21 preferably includes tapered parts 22 with a taper shape that are disposed in the first tip 16 side.

Concerning the connection terminal having such the temporarily holding part, its functional advantages will be described through explanations of a comparative example and a specific example.

Comparative Example

For example, two of the aluminum electric wires are press-fitted into a first slit included in a connection terminal. For the connection terminal without the temporarily holding part, the first slit becomes in the state of being opened, at the stage of the first one of the aluminum electric wires having been press-fitted. In the state of the first slit being opened, when the second one of the aluminum electric wires is press-fitted, the aluminum electric wire is sometimes in insufficient contact with the contact surfaces. As a result, the insulating coating that covers the core wire is not sufficiently removed. The insufficient removal of the insulating coating of the aluminum electric wire increases the contact resistance between the core wire and the contact surfaces. The contact resistance increases to exceed the allowable value, resulting in a poor electrical connection.

Specific Example

By contrast, as shown in FIG. 11, upon press-fitting of the first one of aluminum electric wire 17, connection terminal 10A having temporarily holding part 21 according to the first embodiment holds the first one of aluminum electric wire 17 at temporarily holding part 21. At that time, first slit 13 becomes in the state of being not widely opened because of elasticity and so on.

After that, as shown in FIG. 12, the second one of aluminum electric wire 117 is press-fitted into first slit 13. When press-fitting the second one of aluminum electric wire 117, the second one is pressed together with the first one of aluminum electric wire 17 held at temporarily holding part 21, which thereby press-fits two aluminum electric wires 17 and 117 toward first tip 16 of first slit 13.

As shown in FIG. 13, the simultaneous press-fitting of two aluminum electric wires 17 and 117 allows a stable and appropriate removal of insulating coatings 17B of aluminum electric wires 17 and 117 by contact surfaces 14 included in first slit 13 that has maintained a predetermined slit width.

As a result, core wires 17A of two aluminum electric wires 17 and 117 can be in contact with contact surfaces 14 in the range corresponding to the appropriate contact resistance.

Second Exemplary Embodiment

A connection device according to a second embodiment of the present invention will be described, with reference to FIGS. 14 to 27.

Figure 14:
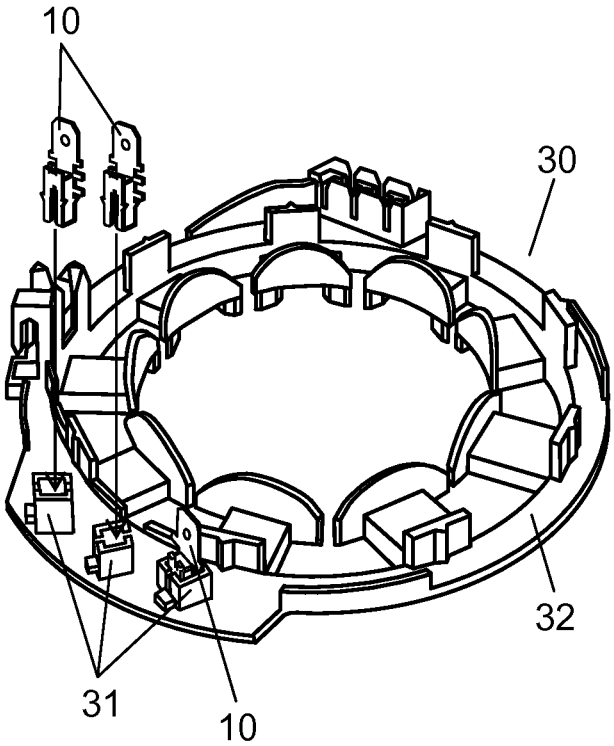
FIG. 14 is a perspective view of a connection device according to a second embodiment of the present invention.
Figure 15:
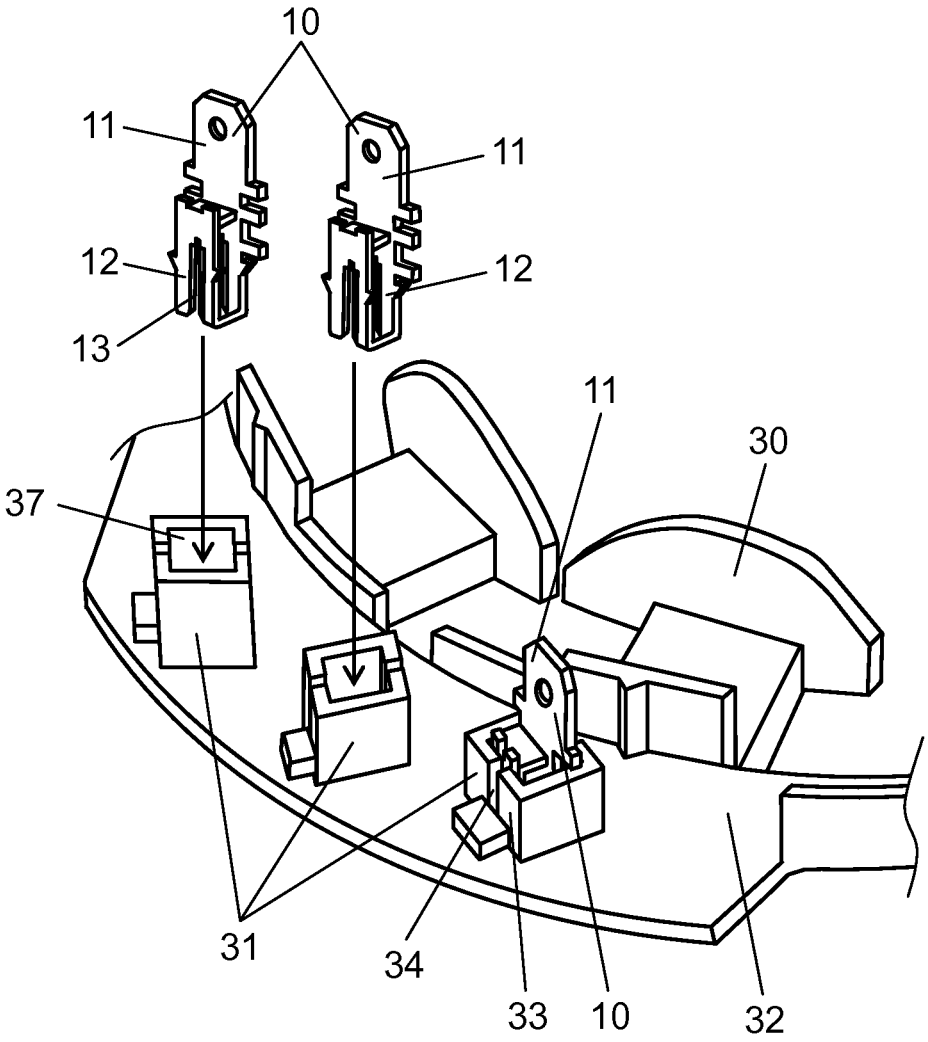
FIG. 15 is a perspective view of a principal part of the connection device according to the second embodiment of the invention.

FIG. 14 is a perspective view of the connection device according to the second embodiment of the invention. FIG. 15 is a perspective view of a principal part of the connection device according to the second embodiment of the invention. Using FIGS. 14 and 15, the general outline of the connection device according to the second embodiment of the invention will be described.

Figure 16:
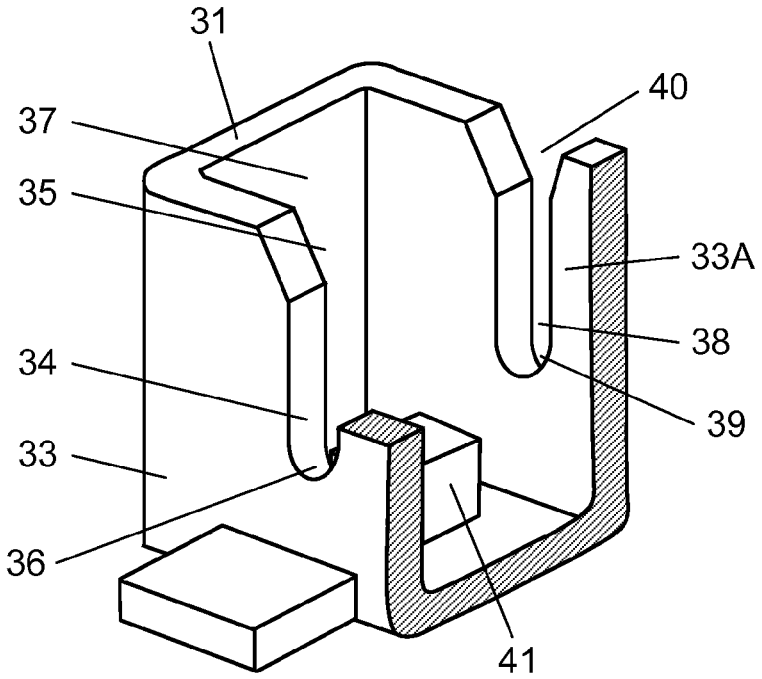
FIG. 16 is a cross-sectional perspective view of a cavity which is included in the connection device according to the second embodiment of the invention.
Figure 17:
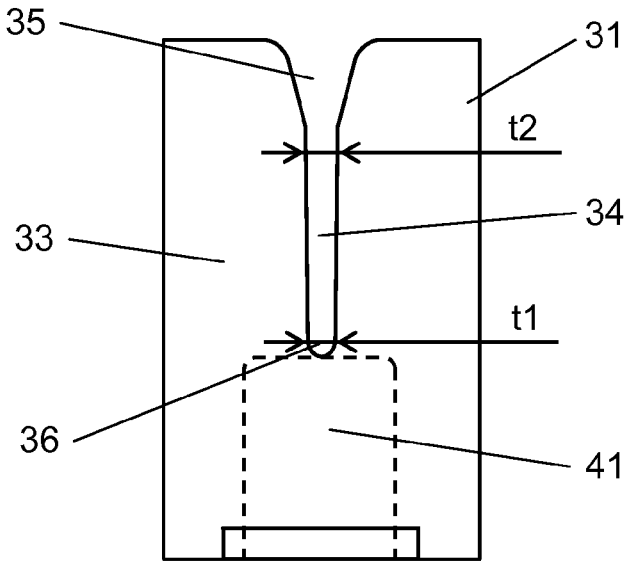
FIG. 17 is an elevational view of the cavity that is included in the connection device according to the second embodiment of the invention.
Figure 18:
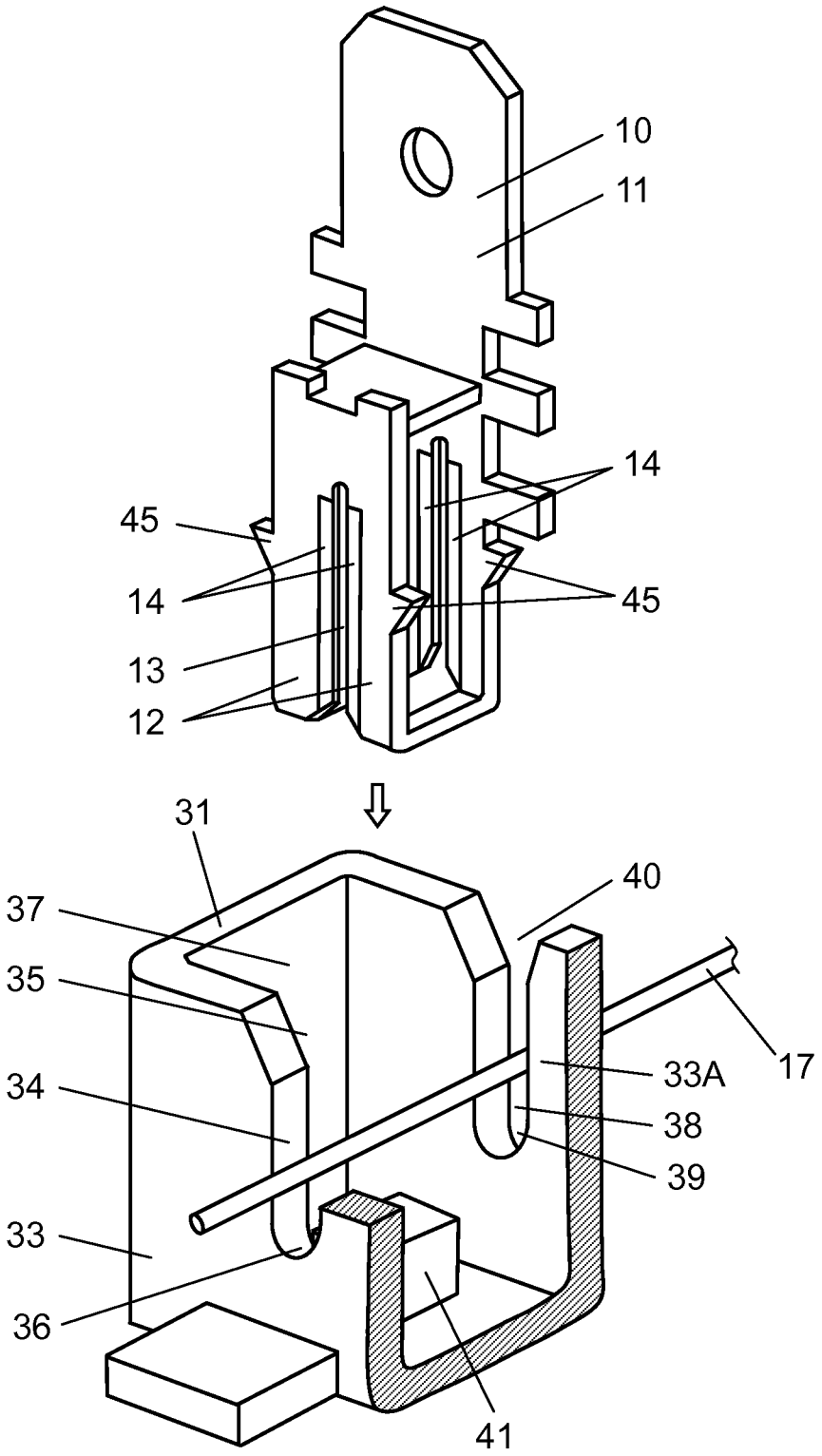
FIG. 18 is a cross-sectional perspective view of a principal part of the connection device according to the second embodiment of the invention.
Figure 19:
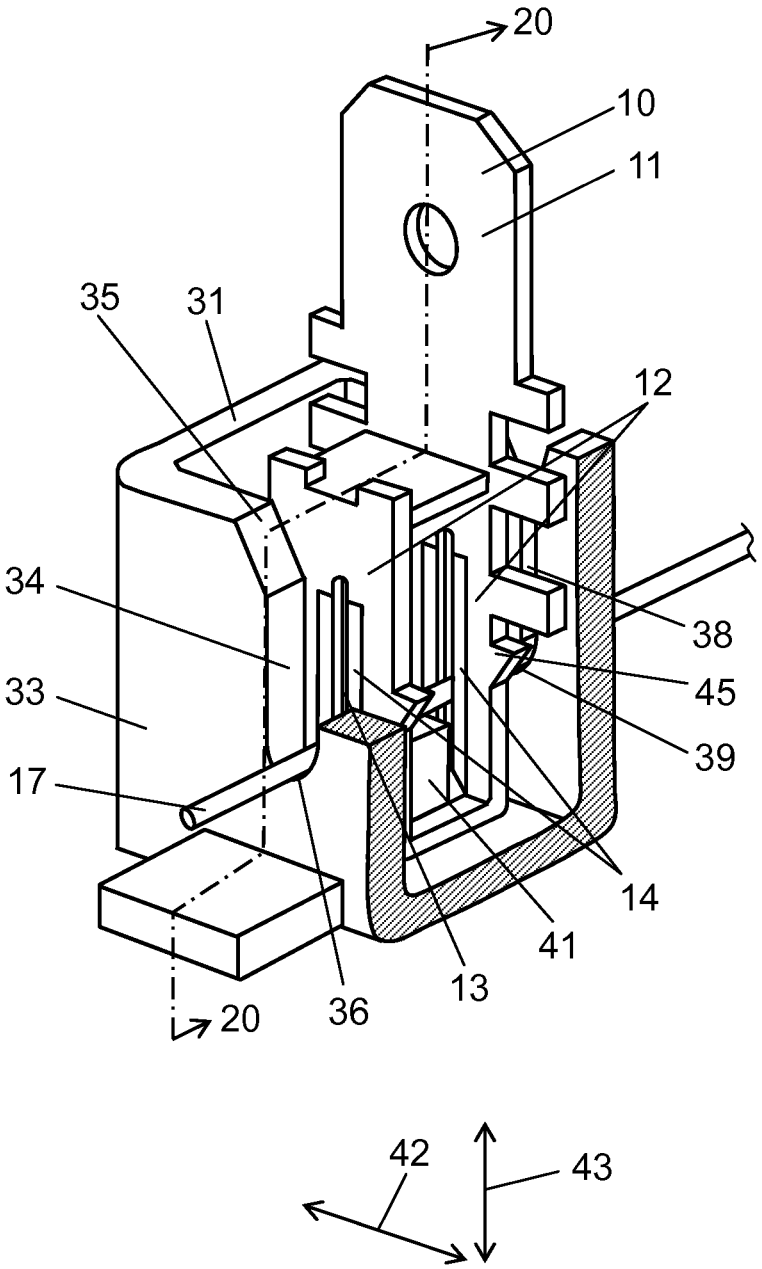
FIG. 19 is another cross-sectional perspective view of the principal part of the connection device according to the second embodiment of the invention.
Figure 20:
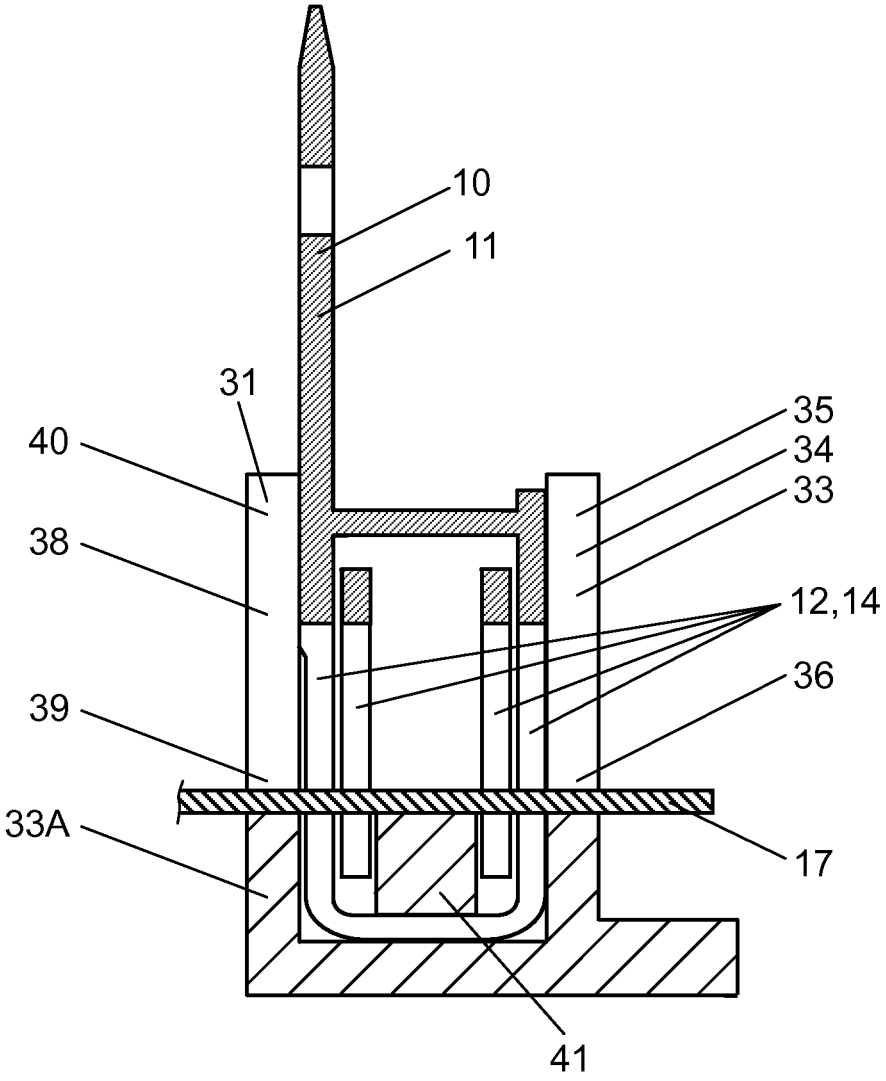
FIG. 20 is a cross-sectional view taken along line 20-20 in FIG. 19.

FIG. 16 is a cross-sectional perspective view of a cavity which is included in the connection device according to the second embodiment of the invention. FIG. 17 is an elevational view of the cavity that is included in the connection device according to the second embodiment of the invention. FIG. 18 is a cross-sectional perspective view of a principal part of the connection device according to the second embodiment of the invention. FIG. 19 is another cross-sectional perspective view of the principal part of the connection device according to the second embodiment of the invention. FIG. 20 is a cross-sectional view taken along line 20-20 in FIG. 19. Using FIGS. 16 to 20, a procedure for assembling the connection device according to the second embodiment of the invention will be described.

Note, however, that the direction in which the connection device is inserted into the cavity is not limited to that in the following descriptions.

The connection device according to the second embodiment of the invention is used for an aluminum electric wire which includes a core wire and an insulating coating that covers the outer peripheral surface of the core wire.

As shown in FIGS. 14 and 15, connection device 30 according to the second embodiment of the invention includes connection terminals 10 and holding part 32 equipped with cavities 31 into which connection terminals 10 are inserted.

For connection terminals 10, the descriptions thereof in the first embodiment are cited herein. Note that, needless to say, connection terminals 10 can be replaced by connection terminals 10A in the following descriptions.

As shown in FIGS. 16 and 17, each of cavities 31 includes wall surface 33 and second slit 34. Wall surface 33 surrounds at least pinching plates of the connection terminal to be inserted. Second slit 34 is formed such that, in wall surface 33, second open end 35 is located in one side of the slit while second tip 36 is located in the other side, at a location facing the first slit included in the connection terminal to be inserted. In second slit 34, second open end 35 is larger in a slit width than second tip 36. That is, width t1 of the second tip is smaller than width t2 of the second open end.

Further details of this are as follows.

The holding part can be formed with a resin. The resin may be polybutylene terephthalate (referred to as PBT, hereinafter), a liquid crystal polymer (referred to as an LCP, hereinafter), or the like.

In particular, the PBT resin is advantageous in view of heat resistance and electric characteristics. The PBT resin is less expensive than the LCP. A specific example of the PBT resin is a PBT resin 1101G-30 manufactured by Toray Industries, Inc.

As shown in FIGS. 14 and 15, holding part 32 includes cavities 31. Each of cavities 31 supports connection terminal 10. As shown in FIG. 15, in cavity 31, pinching plates 12 included in connection terminal 10 are inserted into a space surrounded by wall surface 33. The space surrounded by wall surface 33 holds pinching plates 12, which allows connection terminal 10 to be supported by cavity 31. Note, however, that cavity 31 may be configured such that wall surface 33 further surrounds tab part 11 as long as cavity 31 can support connection terminal 10.

As shown in FIG. 16, wall surface 33 includes second slit 34. In second slit 34, second open end 35 is located in the opening 37 side of cavity 31. Second slit 34 is of a taper shape in which second open end 35 is larger in a slit width than second tip 36. Cavity 31 includes third slit 38 in wall surface 33A that faces wall surface 33 having second slit 34. Third slit 38 may be not of the taper shape, but of a straight shape in which third tip 39 is the same in a slit width as third open end 40. Alternatively, third slit 38 may be of a taper shape larger in silt width than second slit 34.

As long as second slit 34 included in wall surface 33 has the taper shape, the aluminum electric wire to be connected is held by any part of second slit 34 depending on the wire diameter. Accordingly, the use of the connection device including cavities 31 with one type of the shape allows connections of other electric wires than the aluminum electric wire. That is, this provides commonality of the connection devices.

Figure 22:
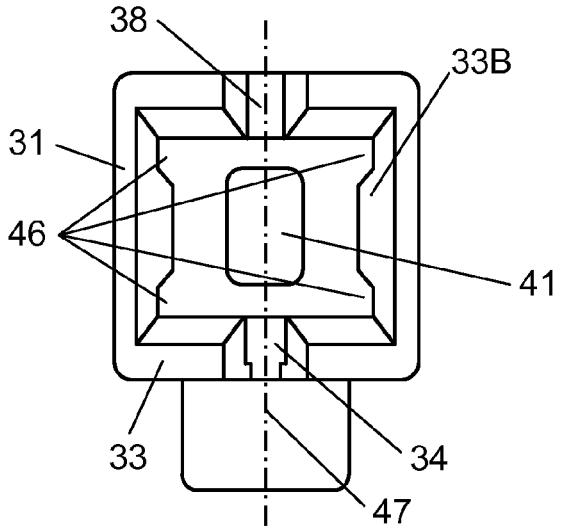
FIG. 22 is a plan view of a cavity which is included in the connection device according to the second embodiment of the invention.

The cavity according to the second embodiment includes an electric wire mount in the inside of the space surrounded by the wall surface. As shown in FIG. 22, electric wire mount 41 disposed on the bottom surface of each of cavities 31 is located on line 47 that connects second slit 34 and third slit 38. As shown in FIG. 17, electric wire mount 41 is preferably the same in height as second tip 36.

In the cavity with the configuration described above, the aluminum electric wire is disposed. As shown in FIG. 18, aluminum electric wire 17 is inserted into second slit 34 included in wall surface 33. Thus-inserted aluminum electric wire 17 is held by second slit 34 with the taper shape. When aluminum electric wire 17 being held by second slit 34, connection terminal 10 is inserted from the opening 37 side of cavity 31, as indicated by the arrow in FIG. 18. Connection terminal 10 is inserted into cavity 31 such that first slit 13 included in pinching plate 12 of connection terminal 10 faces second slit 34 included in wall surface 33 of cavity 31. Upon the insertion of connection terminal 10 into cavity 31, aluminum electric wire 17 held by second slit 34 is then introduced into first slit 13 included in pinching plate 12. Following the insertion of connection terminal 10 into cavity 31, aluminum electric wire 17 is pushed downward in FIG. 18. Then, aluminum electric wire 17 is held by second slit 34 and simultaneously arrives on electric wire mount 41. Moreover, as shown in FIGS. 19 and 20, when connection terminal 10 is pushed into cavity 31, pinching plates 12 included in connection terminal 10 are held in the space surrounded by wall surface 33 included in cavity 31.

Note that, in FIG. 18, the pinching plates (inner pinching plates 12B) disposed in the inside of connection terminal 10 is omitted from the descriptions for the sake of clear understanding of connection terminal 10. Hereinafter, the same omission will be made in the following descriptions.

As shown in FIGS. 19 and 20, aluminum electric wire 17 is restrained by second slit 34 from being out of position in transverse direction 42 indicated by the arrow in the figure. Aluminum electric wire 17 is restrained by electric wire mount 41 from being out of position in height direction 43 indicated by the arrow in the figure. Because electric wire mount 41 is the same in height as second tip 36, aluminum electric wire 17 can undergo a stable removal of the insulating coating by contact surfaces 14 included in pinching plates 12. At that time, third slit 38 does not hold aluminum electric wire 17. Therefore, during the insertion of connection terminal 10 into cavity 31, aluminum electric wire 17 is not subjected to unnecessary forces from third slit 38. Consequently, it is possible to prevent aluminum electric wire 17 from being broken due to the insertion of connection terminal 10 into cavity 31.

As a result, aluminum electric wire 17 and connection terminal 10 are connected with each other with a stable contact resistance. Aluminum electric wire 17 and connection terminal 10 are connected with each other with high reliability. Mounting work of aluminum electric wire 17 can be performed in a state in which the wire is held by second slit 34. This improves workability of the mounting.

Next, configurations featuring more outstanding advantages will be described.

Figure 21:
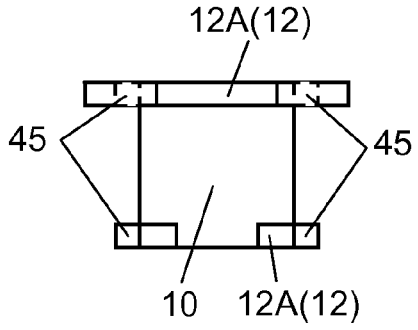
FIG. 21 is a plan view of a connection terminal which is included in the connection device according to the second embodiment of the invention.
Figure 23:
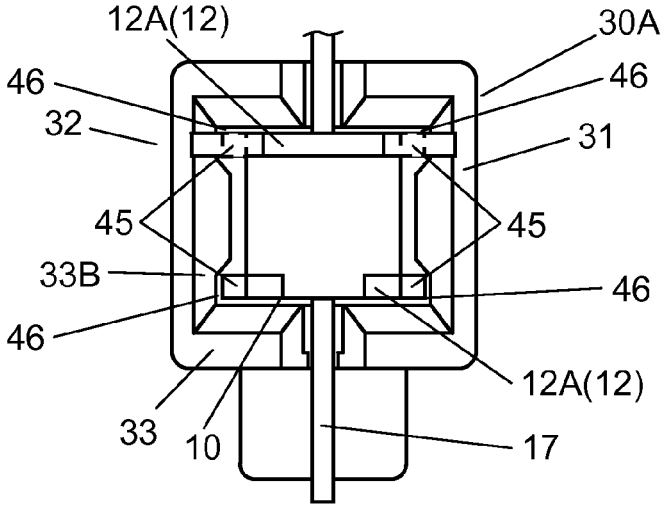
FIG. 23 is a plan view illustrating a state where the connection terminal is inserted into the cavity included in the connection device according to the second embodiment of the invention.

FIG. 21 is a plan view of a connection terminal which is included in the connection device according to the second embodiment of the present invention. FIG. 22 is a plan view of a cavity which is included in the connection device according to the second embodiment of the invention. FIG. 23 is a plan view illustrating a state where the connection terminal is inserted into the cavity included in the connection device according to the second embodiment of the invention. Using FIGS. 21 to 23, descriptions will be made regarding a configuration, which features particularly outstanding functional advantages, of the connection device according to the second embodiment of the invention.

Figure 24:
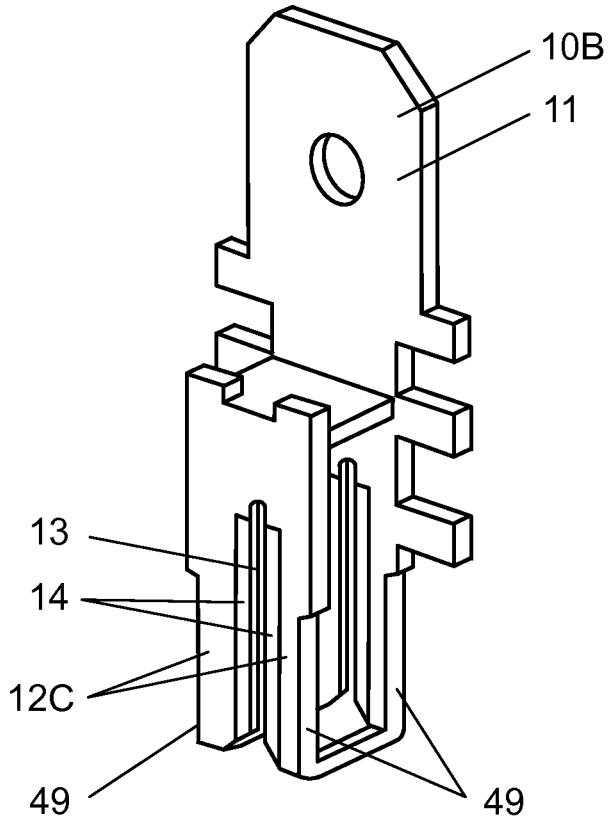
FIG. 24 is a perspective view of another connection terminal which is included in the connection device according to the second embodiment of the invention.
Figure 25:
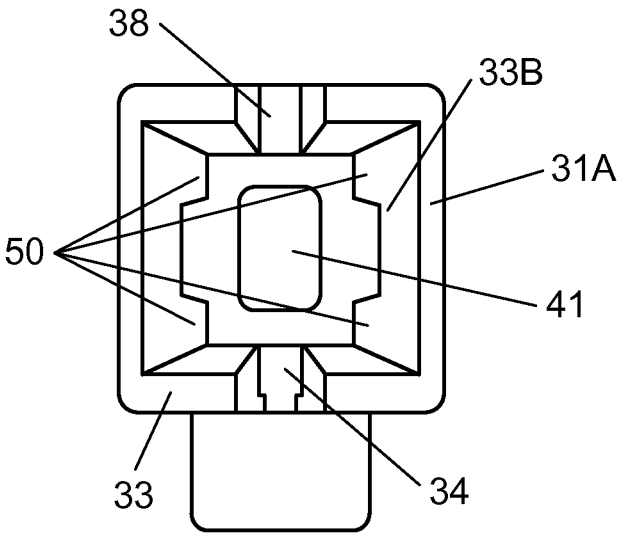
FIG. 25 is a plan view of another cavity which is included in the connection device according to the second embodiment of the invention.
Figure 26:
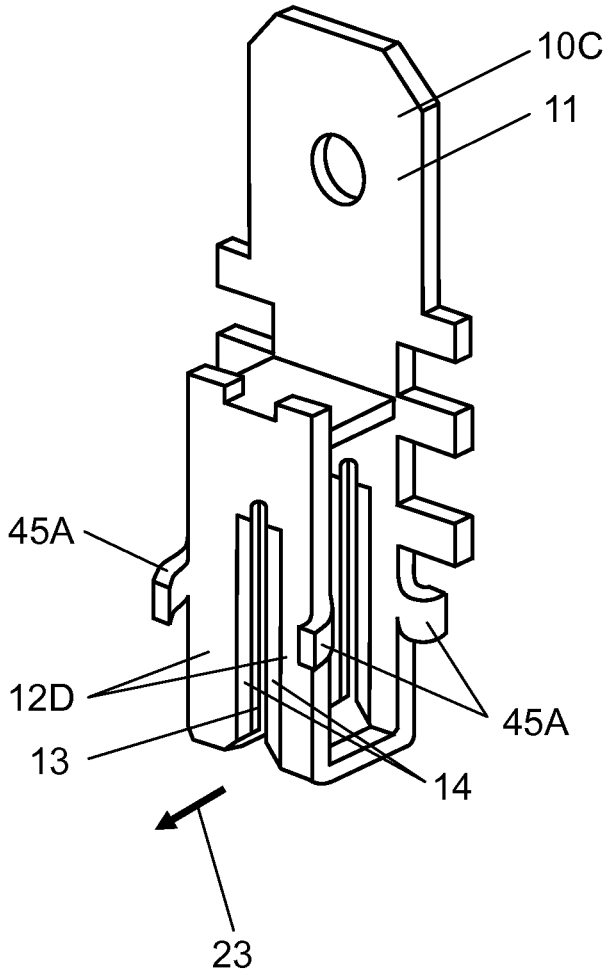
FIG. 26 is a perspective view of a different connection terminal which is included in the connection device according to the second embodiment of the invention.
Figure 27:
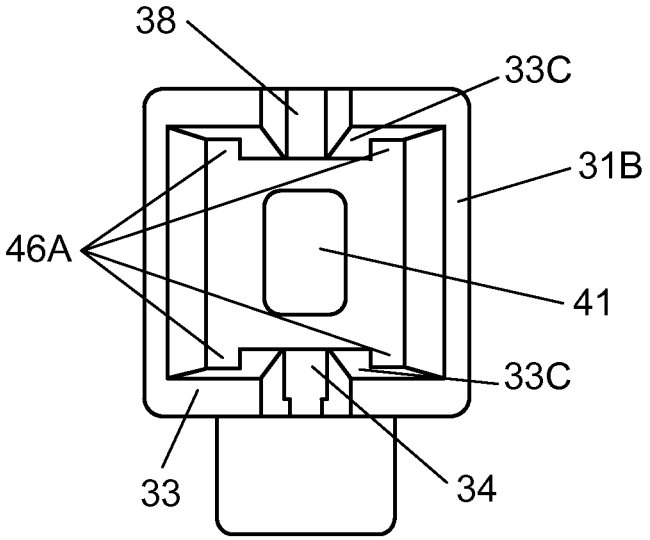
FIG. 27 is a plan view of a different cavity which is included in the connection device according to the second embodiment of the invention.

FIG. 24 is a perspective view of another connection terminal which is included in the connection device according to the second embodiment of the invention. FIG. 25 is a plan view of another cavity which is included in the connection device according to the second embodiment of the invention. FIG. 26 is a perspective view of a different connection terminal which is included in the connection device according to the second embodiment of the invention. FIG. 27 is a plan view of a different cavity which is included in the connection device according to the second embodiment of the invention. Using FIGS. 24 to 27, descriptions will be made regarding another configuration, which features particularly outstanding functional advantages, of the connection device according to the second embodiment of the invention.

In the connection device according to the second embodiment of the invention, each of the pinching plates includes a fitting part while the cavity includes a to-be-fitted part. The pinching plate includes the fitting part in the direction orthogonal to the direction in which the first slit opens from the first tip toward the first open end. The cavity includes the to-be-fitted part that fits onto the fitting part.

The specific configuration is as follows. The fitting part is a projection which protrudes from a side surface of the pinching plate toward the outside. The to-be-fitted part is a recess, which fits onto the projection, in the inner wall surface of the cavity.

Moreover, detailed descriptions will be made using FIGS. 21 to 23.

As shown in FIG. 21, pinching plates 12 held by the wall surface of the cavity include projections 45 that protrude from the side surfaces of pinching plates 12 toward the outside. Projections 45 are disposed at the four corners of outer pinching plates 12A that form the outer shell.

As shown in FIG. 22, in inner wall surface 33B, i.e. wall surface 33 of cavity 31 into which pinching plates 12 are inserted, recesses 46 are disposed at locations corresponding to projections 45. Projections 45 are fitted into recesses 46.

Descriptions will be made regarding functional advantages of the connection device with the configuration described above.

Vibrations and temperature variations are applied to the connection device to which the aluminum electric wire and the connection terminal are connected. If there is some degree of freedom in the insertion position of the connection terminal in the cavity, the connection terminal can move relative to the cavity due to influences of the applied vibrations and temperature variations. Its moving distances are small; however, the influences thereof are accumulated when the connection terminal is subjected to strong vibrations and temperature variations over a long period of time. The accumulation of the small movements will accelerate the creep deformation of the aluminum electric wire. The accelerated creep deformation causes stress relaxation of the aluminum electric wire. As a result, the contact resistance increases between the aluminum electric wire and the connection terminal. Alternatively, a decrease in wire strength of the aluminum electric wire causes the aluminum electric wire to be broken.

Hence, connection device 30A according to the second embodiment is used as shown in FIG. 23. Upon insertion of connection terminal 10 into cavity 31, projections 45 included in pinching plates 12 are fitted into recesses 46 in wall surface 33. The fitting between projections 45 included in pinching plates 12 and recesses 46 in wall surface 33 causes connection terminal 10 to be fixed in cavity 31.

As a result, it is possible to prevent connection terminal 10 from moving relative to cavity 31 even when the vibrations and temperature variations are applied to connection device 30A.

Incidentally, the direction in which connection terminal 10 moves relative to cavity 31 includes rotational directions, a fore-and-aft direction, and a side-to-side linear direction depending on the mode of usage of connection device 30A.

As shown in a fourth embodiment to be described later, in the case where the connection device according to the second embodiment is used in a compressor, it is possible to prevent the movement in the rotational directions.

Note, however, that both the fitting parts included in the pinching plates and the to-be-fitted parts included in the cavity may employ other respective shapes, as long as the connection device can be prevented from moving relative to the cavity.

For example, as shown in FIGS. 24 and 25, the recesses and the projections may be interchanged therebetween in comparison with the connection device shown in FIG. 18. That is, pinching plates 12C included in connection terminal 10B include recesses 49 serving as the fitting parts. Cavity 31A includes projections 50 serving as the to-be-fitted parts.

Alternatively, as shown in FIGS. 26 and 27, pinching plates 12D included in connection terminal 10C include projections 45A, serving as the fitting parts, which are bended along direction 23 in which the pinching plates are arranged. Cavity 31B includes recesses 46A, serving as the to-be-fitted parts, in inner wall surface 33C in which second slit 34 and third slit 38 are formed.

Moreover, it does not matter what the numbers of the fitting parts and the to-be-fitted parts are as long as they can prevent the connection terminal from moving relative to the cavity. For example, only three of the fitting parts may be disposed for the outer pinching plates. Alternatively, only two of the fitting parts may be diagonally disposed for the outer pinching plates.

As can be seen from the above descriptions, the use of the connection terminal according to the second embodiment allows the suppression of the creep deformation of the aluminum electric wire that is used under the difficult conditions in terms of vibration and temperature variation. The suppression of the creep deformation allows the prevention of the occurrence of the stress relaxation. As a result, it is possible to provide the connection device in which the aluminum electric wire and the connection terminal are connected to each other with high reliability.

Third Exemplary Embodiment

A method for manufacturing the connection devices shown in the second embodiment of the present invention will be described using FIGS. 28 to 33. Note that, in a part of the description, the drawings used in the second embodiment are cited herein.

Figure 28:
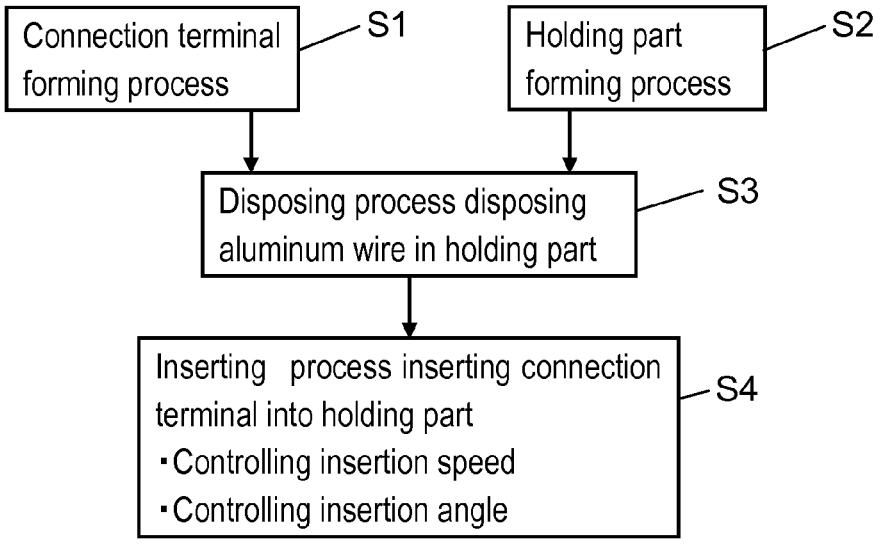
FIG. 28 is a flowchart illustrating a method for manufacturing a connection device according to a third embodiment of the present invention.
Figure 29:
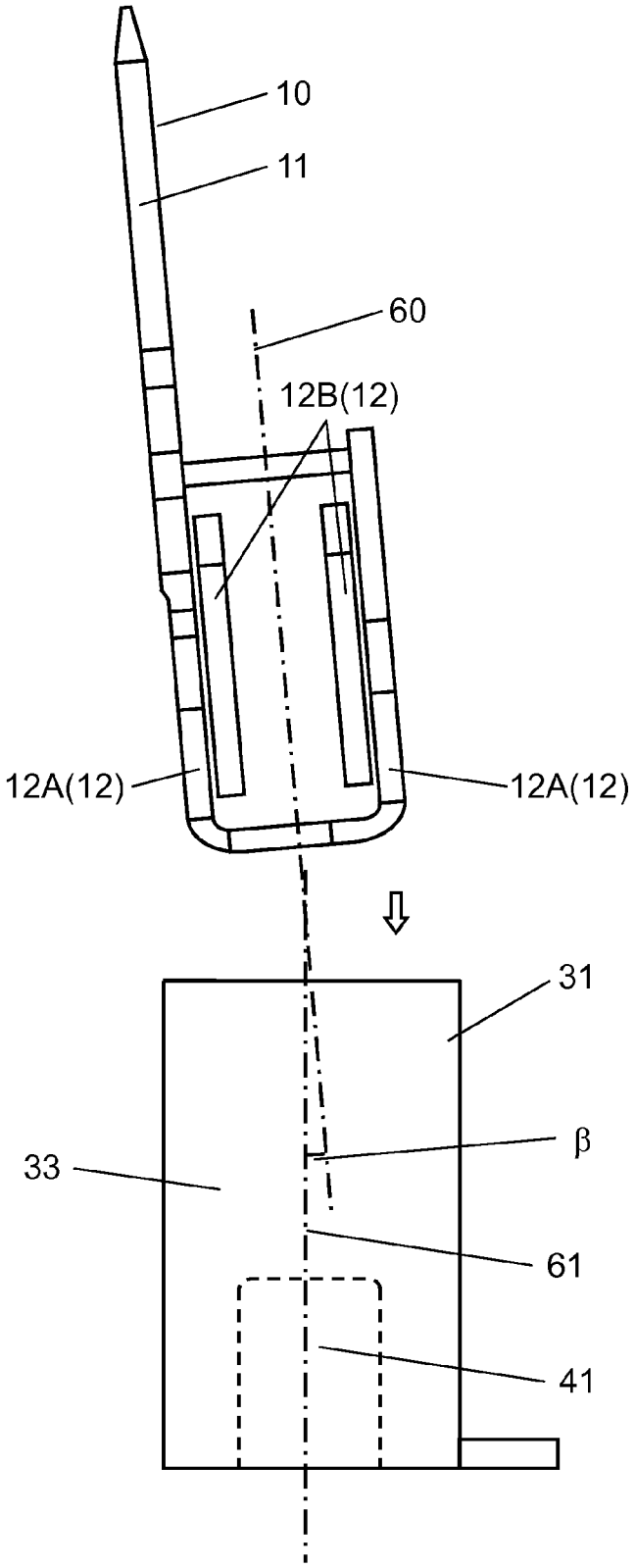
FIG. 29 is an illustrative view of an assembly operation of the connection device according to the third embodiment of the invention.

FIG. 28 is a flowchart illustrating the method for manufacturing a connection device according to a third embodiment of the invention. FIG. 29 is an illustrative view of an assembly operation of the connection device according to the third embodiment of the invention. Using FIGS. 28 and 29, the method for manufacturing the connection device according to the third embodiment of the invention will be described.

Figure 30:
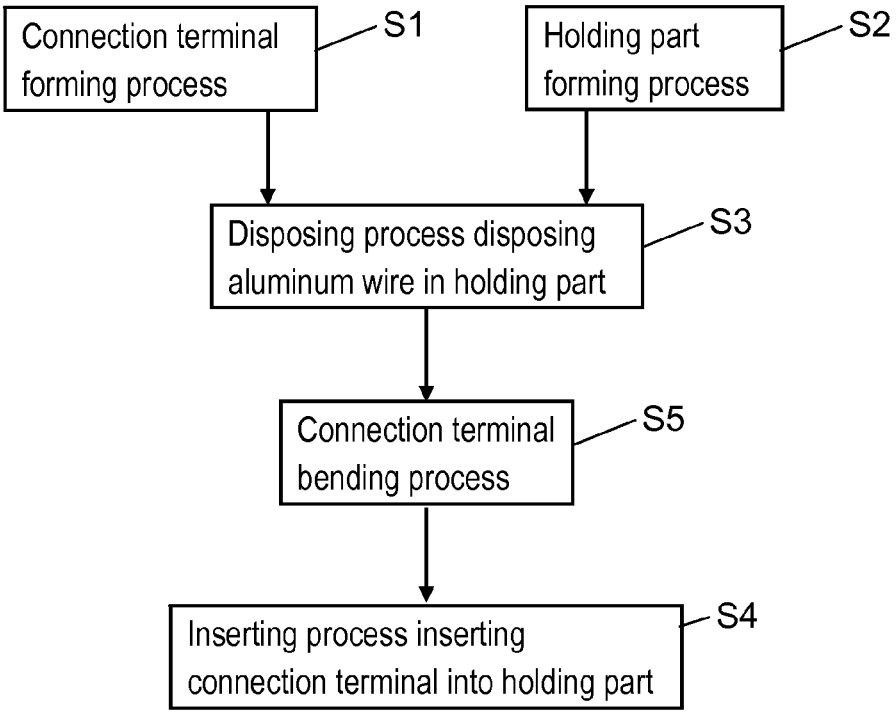
FIG. 30 is a flowchart illustrating another method for manufacturing the connection device according to the third embodiment of the invention.
Figure 31:
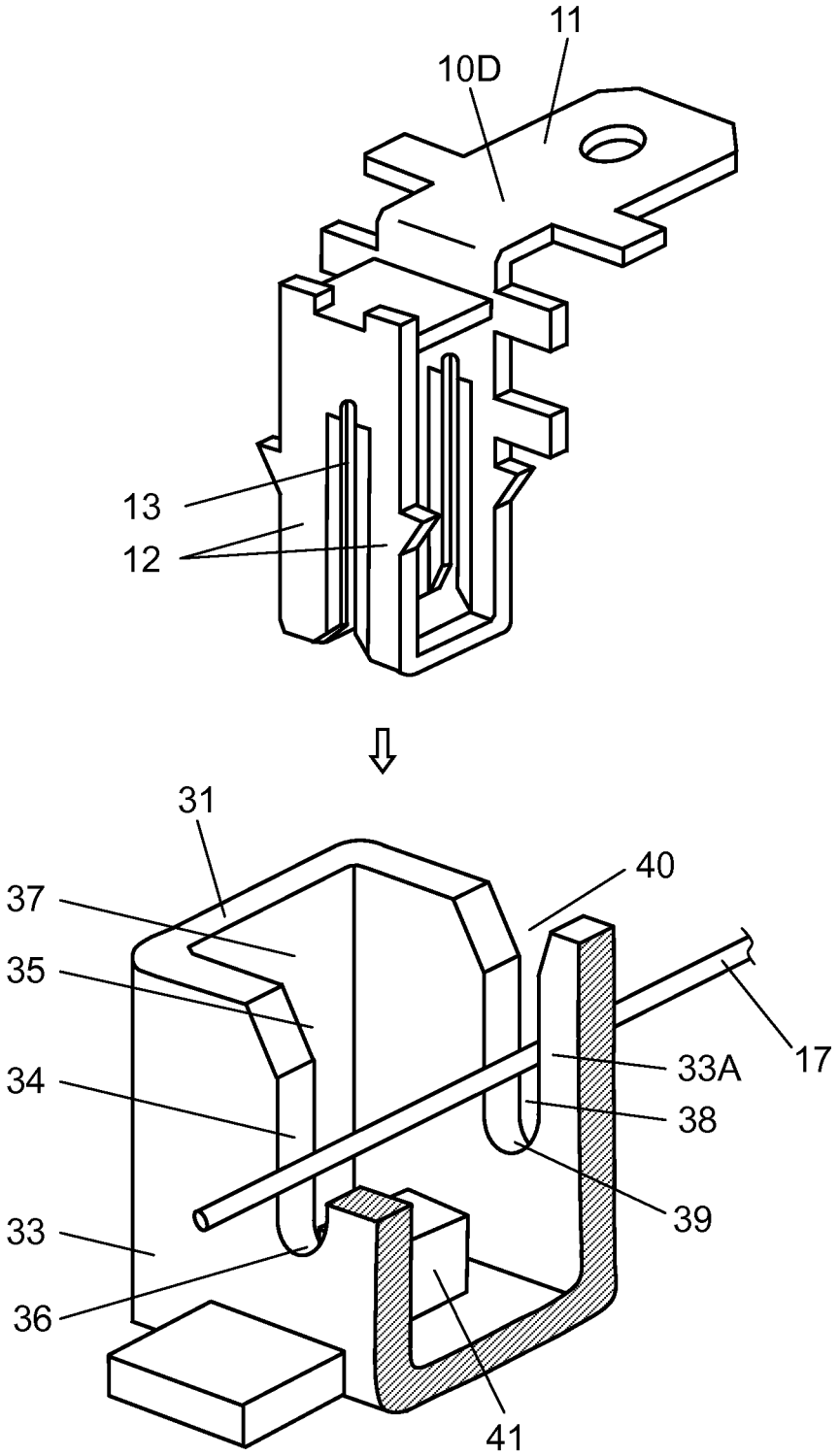
FIG. 31 is a cross-sectional perspective view of a principal part of the connection device according to the third embodiment of the invention.
Figure 32:
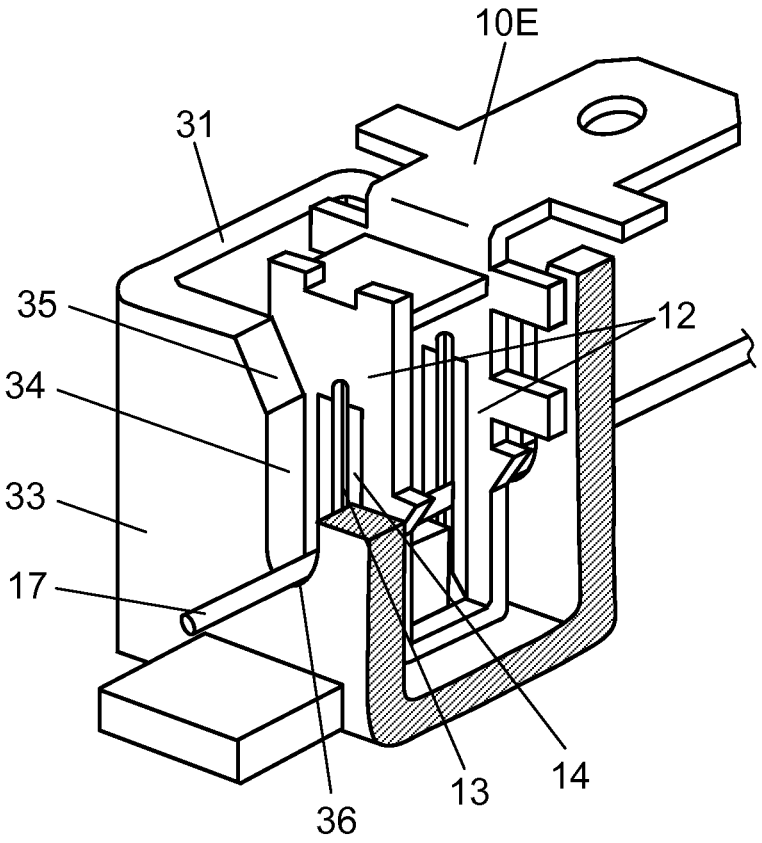
FIG. 32 is another cross-sectional perspective view of the principal part of the connection device according to the third embodiment of the invention.

FIG. 30 is a flowchart illustrating another method for manufacturing the connection device according to the third embodiment of the invention. FIG. 31 is a cross-sectional perspective view of a principal part of the connection device according to the third embodiment of the invention. FIG. 32 is another cross-sectional perspective view of the principal part of the connection device according to the third embodiment of the invention. Using FIGS. 30 to 32, the another method for manufacturing the connection device according to the third embodiment of the invention will be described.

Figure 33:
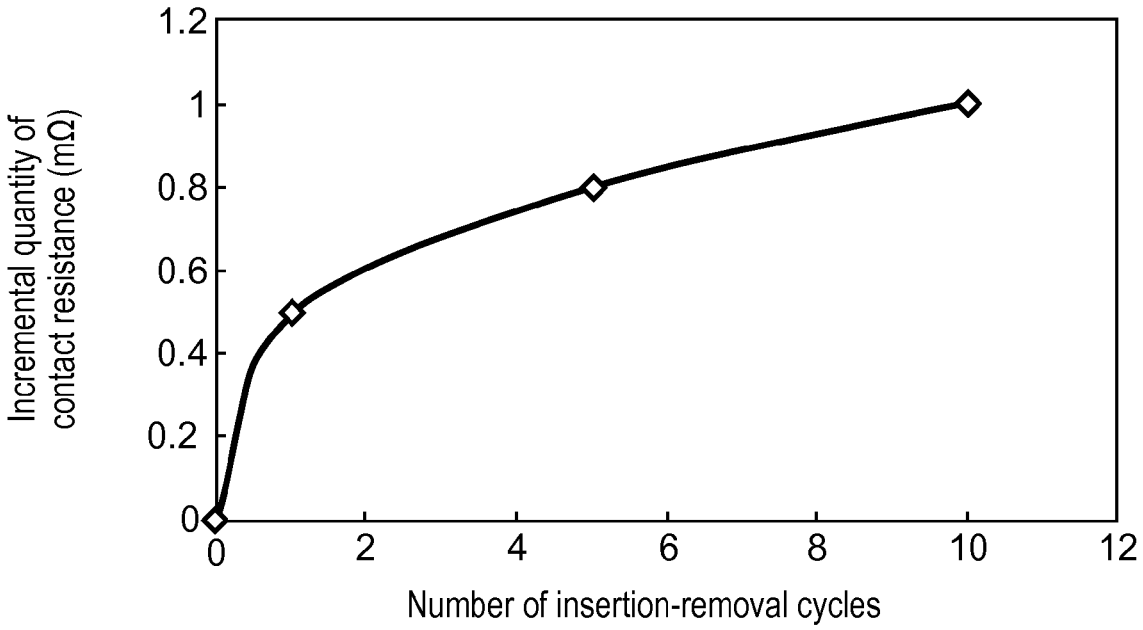
FIG. 33 is a characteristic graph illustrating characteristics of an incremental quantity of contact resistance with respect to the number of insertion-removal cycles of a flat connection terminal into and from the connection device according to the third embodiment of the invention, with the flat connection terminal being fitted into the connection device.

FIG. 33 is a characteristic graph illustrating characteristics of an incremental quantity of contact resistance with respect to the number of insertion-removal cycles of a flat connection terminal into and from the connection device according to the third embodiment of the invention, with the flat connection terminal fitting into the connection device.

The method for manufacturing the connection device according to the third embodiment of the invention includes a process of inserting the connection terminal into a cavity. In the inserting process, the insertion speed of the connection terminal into the cavity is 40 mm/sec to 200 mm/sec.

Moreover, in the inserting process, an insertion angle is within ±10°. The insertion angle is formed by the center line of the connection terminal along an insertion direction of the connection terminal which is inserted into the cavity and the center line of the cavity along an insertion direction of the cavity into which the connection terminal is inserted.

Furthermore, the method includes a process of bending the tab part relative to the pinching plates in the connection terminal. Then, after the bending process, an inserting process is performed.

Details of this are as follows.

As shown in FIG. 28, the manufacture of the connection device shown in the second embodiment of the present invention is started by preparing the connection terminals and the holding parts (S1, S2). The processes designated by S1 and S2 in FIG. 28 may be performed in in-house manufacturing. Alternatively, any of the connection terminals and holding parts may be purchased from other manufacturers.

As shown in FIG. 18, in cavity 31 of the thus-prepared holding part, aluminum electric wire 17 is disposed (S3). Aluminum electric wire 17 is disposed to pass through both second slit 34 and third slit 38 that are included in cavity 31.

After that, as indicated by the arrow in FIG. 18, thus-prepared connection terminal 10 is inserted into cavity 31 of the holding part (S4).

At that time, the insertion speed at which connection terminal 10 is inserted into cavity 31 is set to be 40 mm/sec to 200 mm/sec. By setting the insertion speed to be 40 mm/sec to 200 mm/sec, loads on aluminum electric wire 17 being press-fitted into first slits 13 can be reduced.

That is, when inserting connection terminal 10 into cavity 31, the insulating coating applied to aluminum electric wire 17 is removed by contact surfaces 14 included in pinching plates 12. Moreover, aluminum electric wire 17 is press-fitted into first slits 13 such that the core wire comes in contact with contact surfaces 14 to exhibit a predetermined contact resistance. Accordingly, when inserting connection terminal 10 into cavity 31, these factors need to be taken into consideration in inserting connection terminal 10.

The result of a verification test of this is shown in Table 2.

TABLE 2

Relation between insertion speeds and states of insertion when inserting the connection terminals into the cavities

| | Insertion speed (mm/sec) | | | | | | | | |
|---|---|---|---|---|---|---|---|---|---|
| | 10 | 20 | 30 | 40 | 50 | 70 | 100 | 200 | 300 |
| State of insertion | X | X | X | ○ | ○ | ○ | ○ | ○ | X |

○: good pressure contact
X: broken wire or twisted terminal

The verification test has shown that the insertion speeds slower than 40 mm/sec result in broken aluminum electric wires 17. This appears to be because so-called moving-together phenomenon occurs in which aluminum electric wire 17 moves together with connection terminal 10 that is inserted into cavities 31.

Moreover, the insertion speeds faster than 200 mm/sec result in failures of twisted connection terminals 10 or broken cavities 31.

As can be seen from the above result, with the insertion speed ranging 40 mm/sec to 200 mm/sec, it is possible to suppress the occurrence of the failures in the manufacturing process in which connection terminal 10 is inserted into cavity 31.

Moreover, as shown in FIG. 29, let β be the insertion angle when inserting connection terminal 10 into cavity 31. The insertion angle is formed by center line 60 of connection terminal 10 along the insertion direction of connection terminal 10 which is inserted into cavity 31 and center line 61 of cavity 31 along the insertion direction of cavity 31 into which connection terminal 10 is inserted. By setting insertion angle β to be within ±10°, it is possible to prevent the occurrence of the deformation of connection terminal 10 when inserting connection terminal 10 into cavity 31.

It is considered that the deformation of connection terminal 10 depending on the insertion angle is considered to be factors responsible for a state of twisting between cavity 31 and connection terminal 10. The state of twisting is considered to accelerate the creep deformation when the connection device is used under difficult conditions.

Consequently, the restriction of the insertion angle allows the suppression of the occurrence of the creep deformation in the aluminum electric wire.

Therefore, as shown in the fourth embodiment to be described later, the connection device into which the connection terminals are press-fitted is used in a compressor. It is possible to suppress the acceleration of the creep deformation even when the connection device described above is used inside the compressor under difficult conditions in terms of vibration and temperature variation. The suppression of the acceleration of the creep deformation allows the prevention of the stress relaxation of the aluminum electric wire. As a result, it is possible to provide the connection device in which the aluminum electric wire and the connection terminal are connected to each other with high reliability.

Alternatively, as shown in FIGS. 18 and 30, the connection terminal is bent (S5) after aluminum electric wire 17 has been disposed (S3) in cavity 31 of thus-prepared holding part 32.

As shown in FIGS. 30 and 31, thus-bent connection terminal 10D is inserted into cavity 31 of the holding part (S4).

For example, there are sometimes cases where the connection device is subjected to a height limit when used in such as the compressor shown in the fourth embodiment.

In the cases, the flat connection terminal to be fitted into the connection terminal is sometimes formed to be a flag-shaped terminal. Moreover, when subjected to the height limit, there is no choice but to bend the connection terminal at a boundary between the tab part and the pinching plates thereof. Therefore, as shown in FIG. 31, connection terminal 10D is bent in advance. Thus-bent connection terminal 10D is inserted into cavity 31. Employing such the manufacturing method makes it possible to suppress the deformation of connection terminal 10D.

Consequently, it is possible to suppress poor contact due to the deformation of the connection terminal. As a result, there is no occurrence of heat generation or the like caused by the poor contact at the connecting portions between the connection terminal and the aluminum electric wire, the connection terminal and the flat connection terminal, the connection terminal and the flag-shaped terminal, and the like.

Table 3 shows a relation between contact resistance and the bending of the connection terminal.

TABLE 3

Variations in contact resistance with respect to the bending of the connection terminals

| Conditions | No-bending | Pre-bending | Post-bending |
|---|---|---|---|
| Contact resistance (mΩ) | 0.4 | 0.4 | 1.0 |

"No-bending" referred in Table 3 is the states of connection terminals 10 and 10A shown in the first and second embodiments, respectively. "Pre-bending" is the state of connection terminal 10D that is formed in advance by bending process S5 described in the third embodiment. "Post-bending" is the state of connection terminal 10E shown in FIG. 32 that is formed by bending tab part 11 after connection terminal 10 has been inserted into cavity 31.

As can be seen from FIG. 3, "pre-bended" connection terminal 10D shows no difference in contact resistance from "no-bended" connection terminal 10. On the other hand, "post-bended" connection terminal 10E shows 1.5 times higher contact resistance than "no-bended" connection terminal 10.

This is thought to be due to an unnecessary deformation of connection terminal 10E, which is caused by bending tab part 11 without direct holding of the pinching plates 12 side when bending connection terminal 10E.

Moreover, variations in contact resistance of the flag-shaped terminal have been verified, with the terminal being subjected to insertion-removal cycles, i.e. repeatedly inserting and removing the terminal into and from tab part 11.

The result is shown in FIG. 33. As shown in FIG. 33, it has been verified that the one-time removal causes a large increase in contact resistance.

In other words, the pre-bending of the connection terminal yields a stable shape of the connection terminal. It is the pre-bended connection terminal that is inserted into the cavity. Therefore, the portion connected to the pre-bended connection terminal will provide the stable contact resistance. As a result, it is possible to provide the connection device in which the aluminum electric wire and the connection terminal are connected to each other with high reliability.

Note, however, that the direction in which the tab part is bent relative to the connection terminal is optionally set in accordance with situations of such as the flag-shaped terminal to be fitted. The direction in which the tab part is bent relative to the connection terminal is not limited to that in the above descriptions.

Fourth Exemplary Embodiment

A fourth embodiment of the present invention will be described, with reference to the accompanying drawings.

Figure 34:
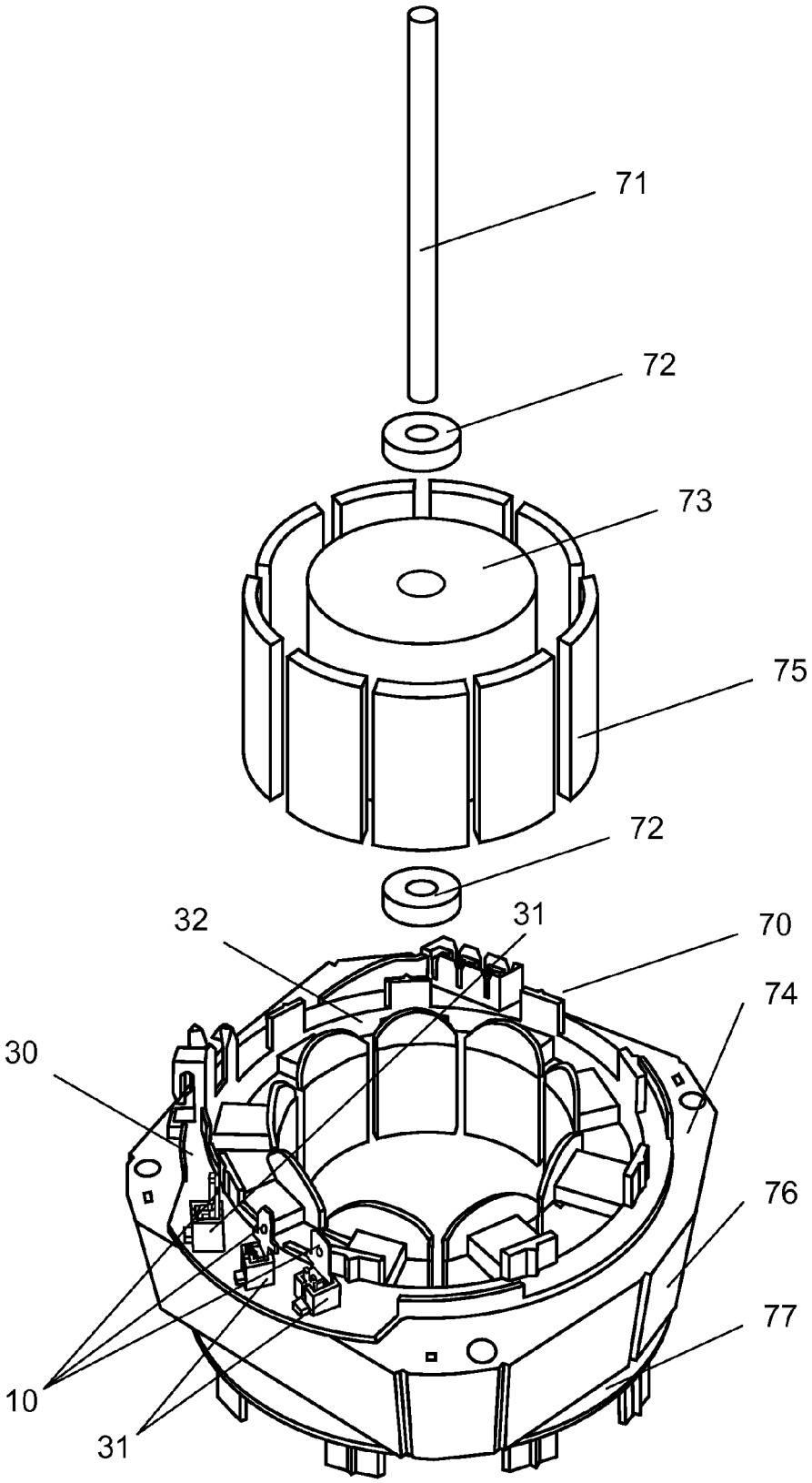
FIG. 34 is a perspective assembly view of a motor according to a fourth embodiment of the present invention.
Figure 35:
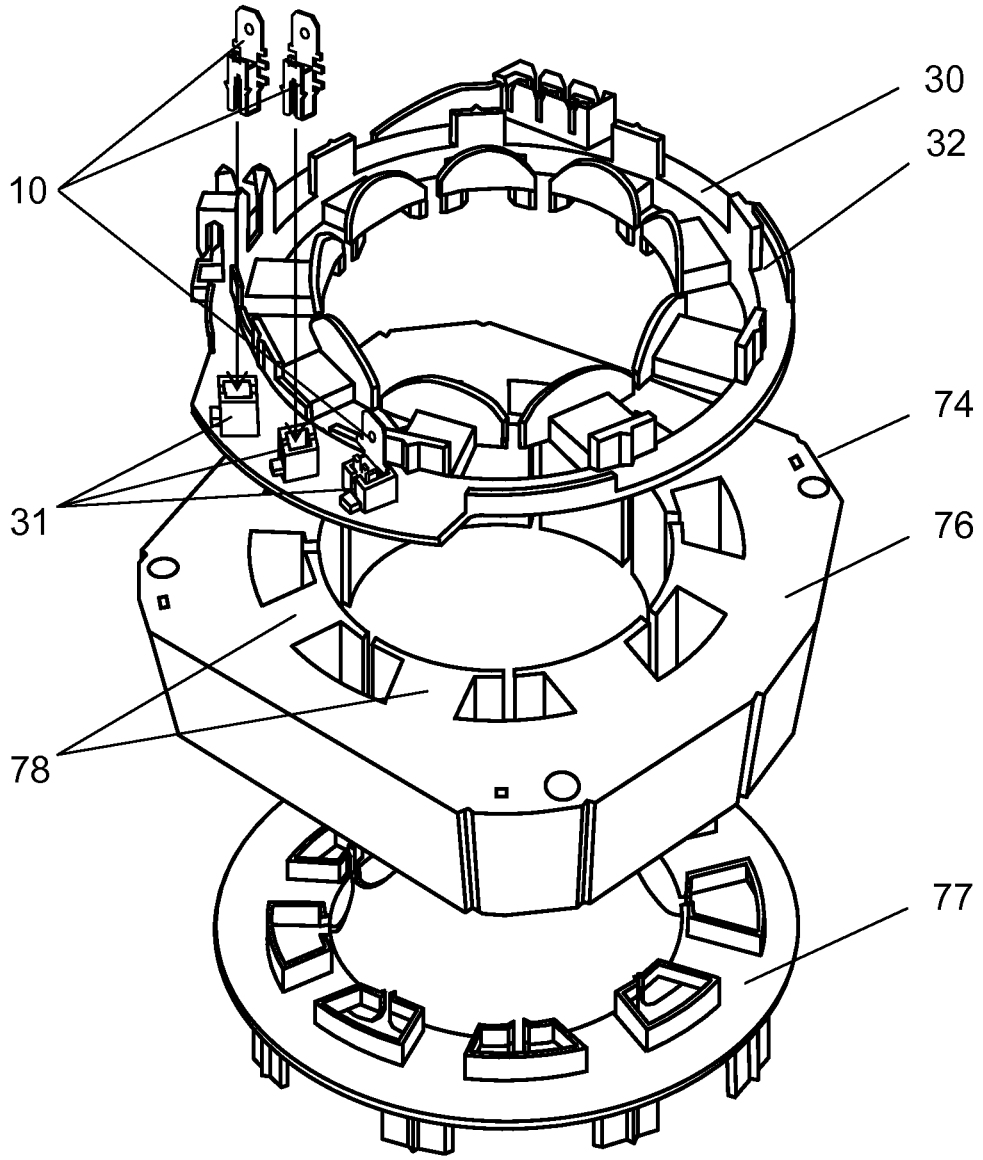
FIG. 35 is a perspective assembly view of a stator which is included in the motor according to the fourth embodiment of the invention.
Figure 36:
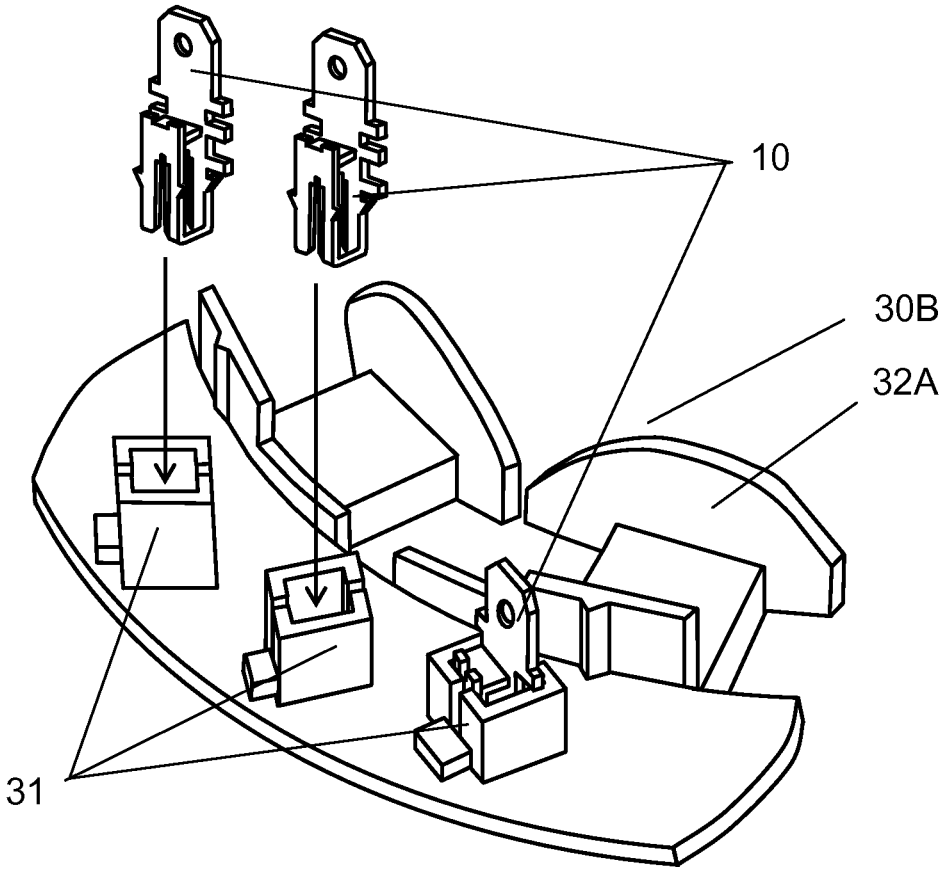
FIG. 36 is a perspective assembly view of another connection device which is included in the motor according to the fourth embodiment of the invention.

FIG. 34 is a perspective assembly view of a motor according to the fourth embodiment of the invention. FIG. 35 is a perspective assembly view of a stator which is included in the motor according to the fourth embodiment of the invention. FIG. 36 is a perspective assembly view of another connection device which is included in the motor according to the fourth embodiment of the invention.

The motor using the connection device shown in the second embodiment of the invention will be described using FIGS. 34 to 36.

FIG. 34 shows an example of the motor according to the fourth embodiment of the invention. The motor according to the fourth embodiment of the invention is a brushless motor. The aspect of the motor according to the fourth embodiment of the invention is applicable to motors with other configurations.

Motor 70 includes rotary shaft 71, a pair of shaft bearings 72, rotor 73, and stator 74.

The pair of shaft bearings 72 are attached to rotary shaft 71 so as to sandwich rotor 73. Rotor 73 includes magnets 75 at the outer periphery thereof. Rotor 73 is inserted into the inside of stator 74 such that the stator 74 faces magnets 75 included at the outer periphery of the rotor.

As shown in FIG. 35, stator 74 includes holding part 32, core 76, and fixing member 77. Core 76 is fitted to and fixed between holding part 32 and fixing member 77. A winding is wound on each of teeth 78 included in stator 74. One end of the winding is connected to connection terminal 10 that is inserted into each of cavities 31 included in holding part 32.

In this way, the motor according to the fourth embodiment of the present invention is configured.

Note that, as shown in FIG. 36, in the motor according to the fourth embodiment of the invention, connection device 30B may be formed of holding part 32A that is composed of only a principal part thereof. In this case, an insulating film or the like may be employed for insulation of, such as, core 76 shown in FIG. 35.

The motor described above is used in a compressor shown in FIG. 37.

Figure 37:
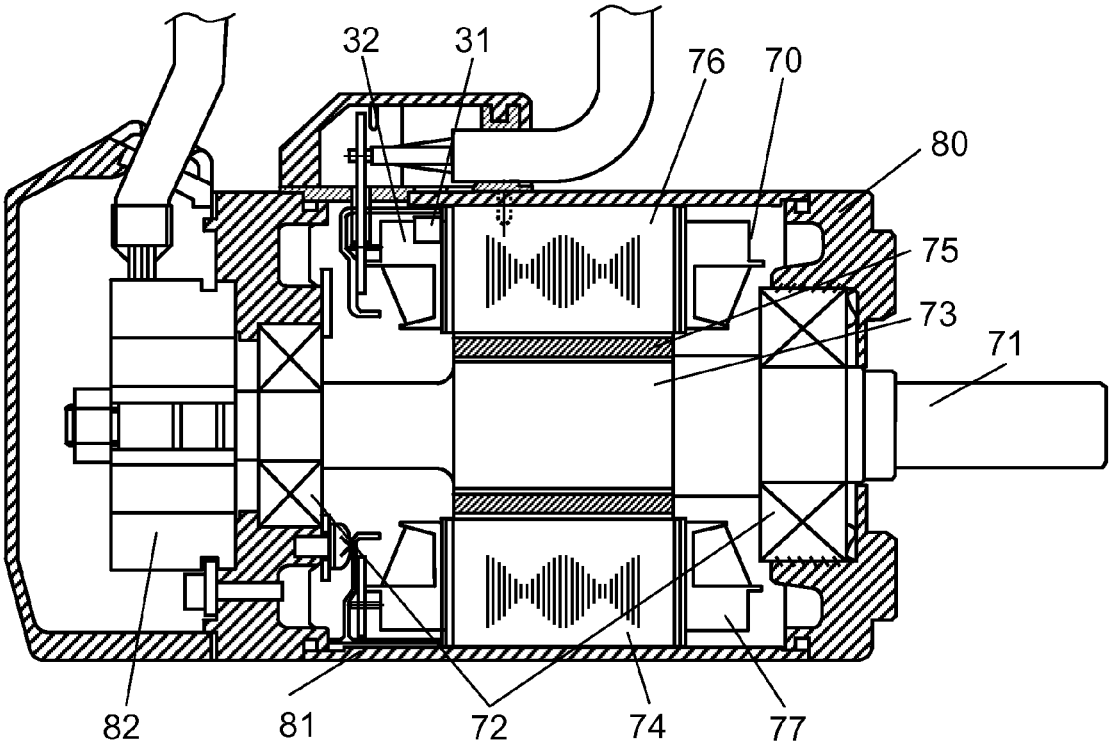
FIG. 37 is a cross-sectional view of a compressor according to the fourth embodiment of the invention.
Figure 38:
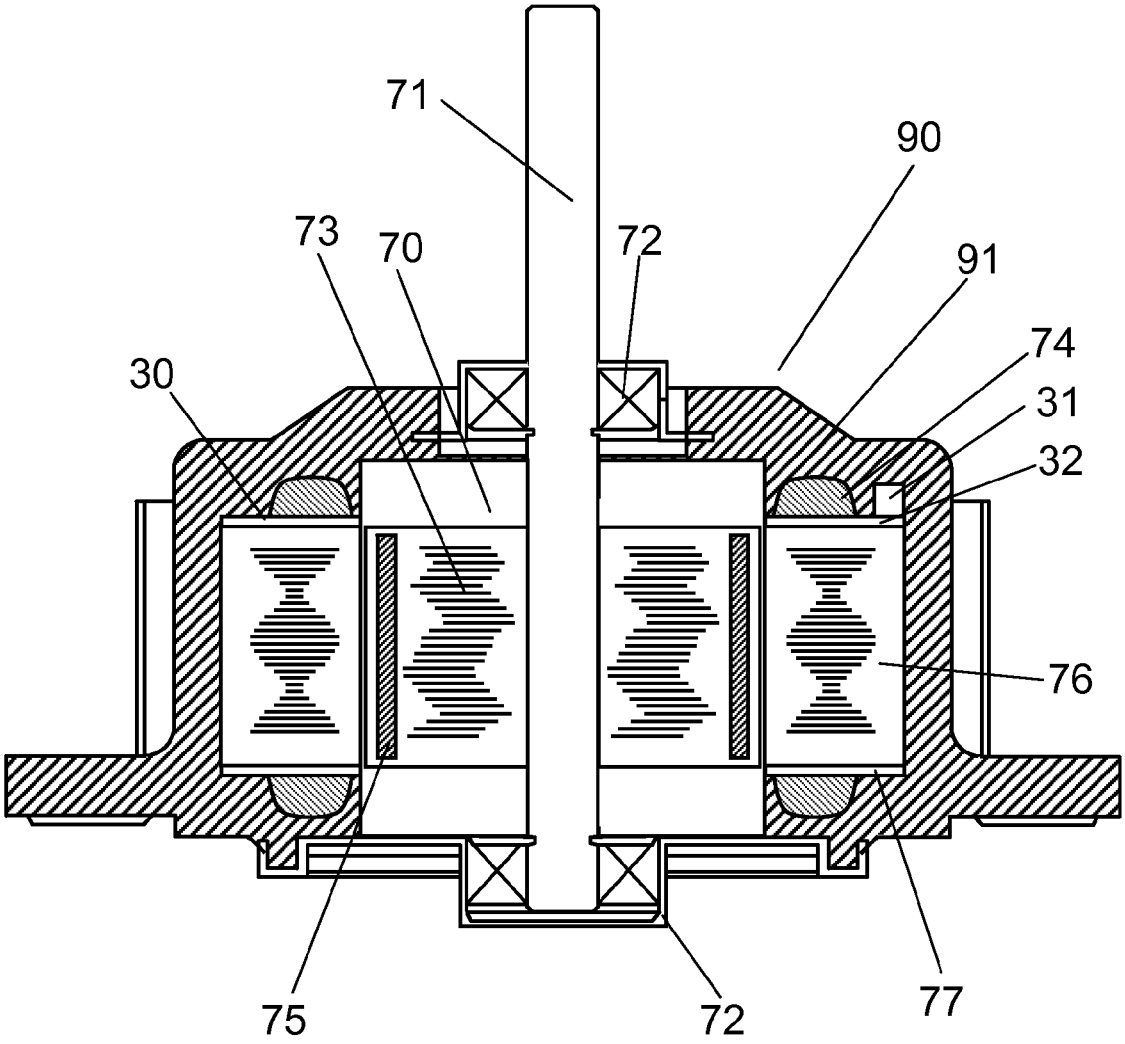
FIG. 38 is a cross-sectional view of a blower according to the fourth embodiment of the invention.

FIG. 37 is a cross-sectional view of the compressor according to the fourth embodiment of the invention. FIG. 38 is a cross-sectional view of a blower according to the fourth embodiment of the invention.

In addition, the compressor using the motor will be described using FIG. 37. Likewise, the blower using the motor will be described using FIG. 38.

Compressor 80 includes motor 70 and compression part 82 in case 81 thereof. Case 81 is equipped with an intake pipe and a discharge pipe.

A coolant suctioned into case 81 via the intake pipe is conveyed into compression part 82. Compression part 82 is driven by motor 70. Compression part 82 is driven to compress the coolant. The compressed coolant is discharged from the discharge pipe into a refrigeration cycle.

Like this, the motor is used in the blower shown in FIG. 38.

Blower 90 includes motor 70 in case 91 thereof. A fan is attached to rotary shaft 71. The rotation of rotor 73 causes a rotation of the fan attached to rotary shaft 71.

The motor according to the fourth embodiment of the invention is applicable to a wide range of applications. Among the applications, the compressor is used under difficult conditions in terms of vibration and temperature variation and the blower is used under difficult conditions in terms of vibration.

However, as described in detail in the second embodiment, the use of the connection device according to the second embodiment of the invention allows the suppression of the movement of the connection terminal relative to the cavity even when being used under the difficult conditions in terms of vibration and temperature variation.

Accordingly, the creep deformation occurring in the aluminum electric wire is suppressed. The suppression of the creep deformation, in turn, allows the prevention of the stress relaxation. As a result, it is possible to provide the motor in which the aluminum electric wire and the connection terminal are connected to each other with high reliability. Moreover, it is possible to provide the compressor using the motor and the blower using the motor.

Advantages of the compressor and the blower according to the fourth embodiment of the invention were examined, in comparison with comparative ones using conventional connection terminals. The result will be described using Table 4, FIG. 39, and FIG. 40.

The comparison was made through a thermal shock test and a vibration test. Table 4 shows combinations of the test objects. After each of the tests had been conducted, variations in contact resistance were examined and evaluated.

Comparison of combinations of connection terminals and electric wire materials

TABLE 4

Comparison of combinations of connection terminal materials and electric wire materials

| Items | Example 1 | Comparative Example 1 | Comparative Example 2 |
|---|---|---|---|
| Connection terminal | Terminal of the embodiment | Conventional terminal | Conventional terminal |
| Electric wire material | Aluminum | Aluminum | Copper |

Figure 39:
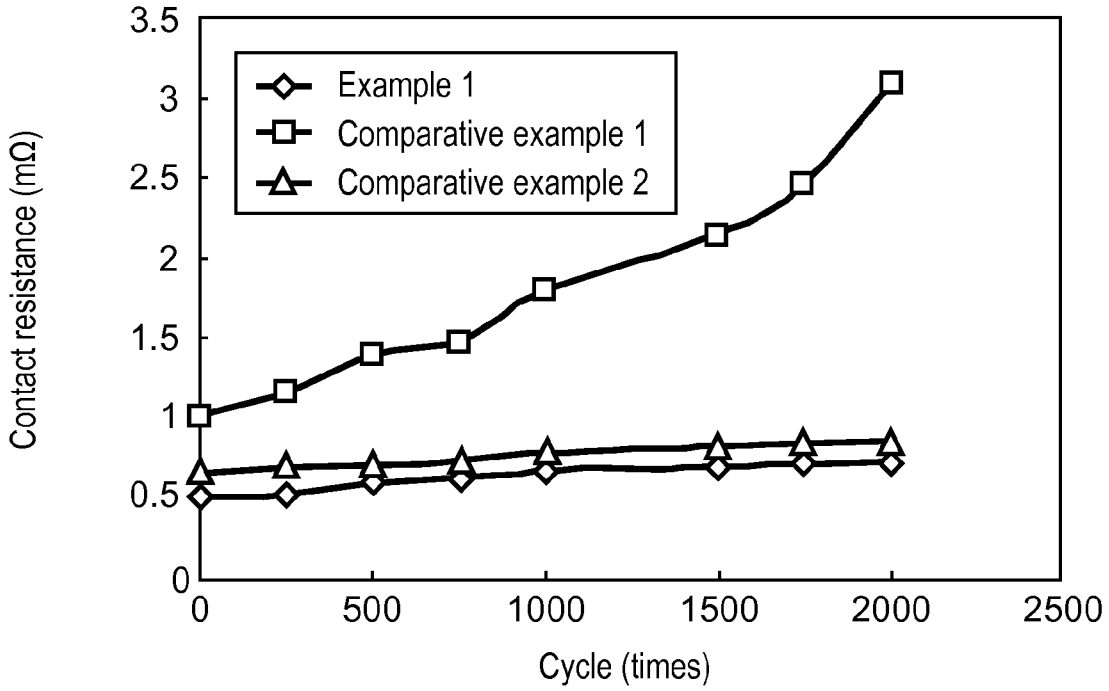
FIG. 39 is a characteristic graph illustrating characteristics of contact resistance with respect to the number of cycles of a thermal shock test which compares the connection device according to the fourth embodiment of the invention with comparative ones.
Figure 40:
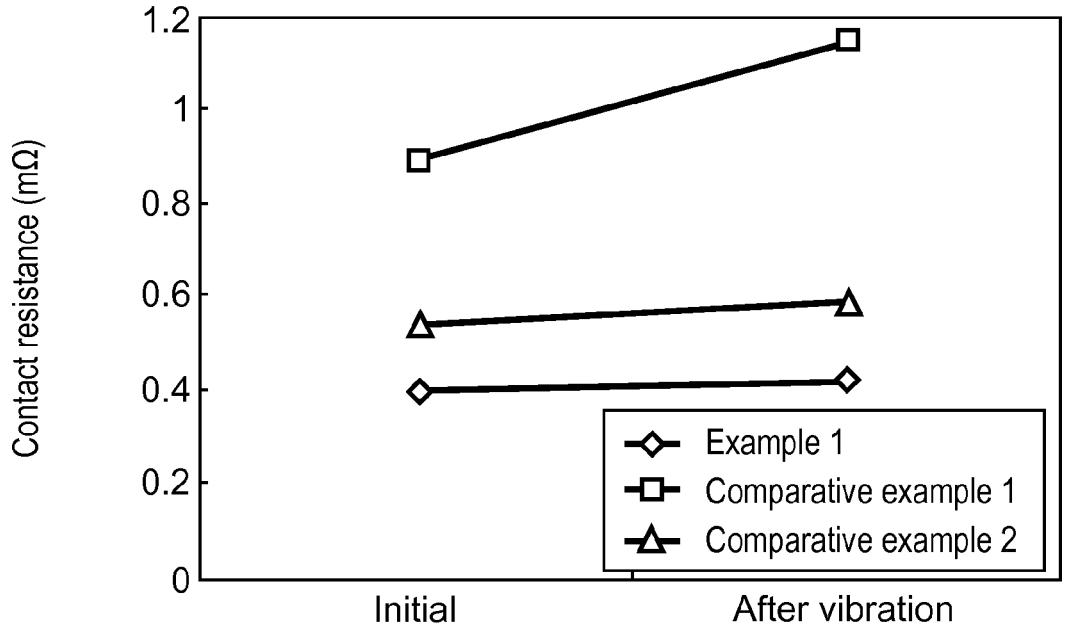
FIG. 40 is a characteristic graph illustrating characteristics of the contact resistance before and after a vibration test which compares the connection device according to the fourth embodiment of the invention with the comparative ones.

FIG. 39 is a characteristic graph that illustrates a relation between the contact resistance and the number of cycles of the thermal shock test that compares the connection device according to the fourth embodiment of the invention with the comparative ones. FIG. 40 is a characteristic graph that illustrates the contact resistance before and after the vibration test that compares the connection device according to the fourth embodiment of the invention with the comparative ones.

Using FIGS. 39 and 40, the result of the comparison will be described between the example according to the embodiment of the invention and the conventional ones.

The thermal shock test was carried out with the following conditions. The ambient temperature was varied from −40° C. to 120° C. One cycle consisted of states, i.e. the state where the ambient temperature of −40° C. was kept for 30 minutes and the state where the ambient temperature of 120° C. was kept for 30 minutes. The cycle was repeated 2000 times, i.e. 2000 cycles.

The vibration test was carried out with the following conditions. The vibration frequency was in a range from 10 Hz to 55 Hz. The linear sweep time was one minute. The amplitude was 1.6 mm, with a current of 0.1 A flowing through the test objects. The vibration was made in three directions, i.e. fore-and-aft, up-and-down, and side-to-side directions.

From Table 4 and FIG. 39, the result of the thermal shock test allows to confirm that a remarkable increase in contact resistance appears for Comparative Example 1 that uses the combination of the conventional connection terminal and the aluminum electric wire. The combination having been thought to involve the subject to be solved.

On the other hand, the thermal shock test allows to confirm that Example 1 exhibits the contact resistance comparable to or smaller than that of the combination of the conventional connection terminal and the copper electric wire (Comparative Example 2).

Moreover, from Table 4 and FIG. 40, the result of the vibration test allows to confirm that a remarkable increase in contact resistance appears for Comparative Example 1 that uses the combination of the conventional connection terminal and the aluminum electric wire, where the combination have been thought to involve the subject to be solved.

On the other hand, the vibration test has shown that Example 1 exhibits the contact resistance comparable to or smaller than that of the combination of the conventional connection terminal and the copper electric wire (Comparative Example 2).

As can be seen from the above results, the use of each of the embodiments of the present invention allows the following functional advantages.

That is, the aluminum electric wire can be used, which allows a reduction in weight of electrical apparatus.

Further, it is possible to prevent the occurrence of the stress relaxation by suppressing the creep deformation, even in the use of the aluminum electric wire under difficult conditions in terms of vibration and temperature variation. The occurrence of the stress relaxation has been a matter of concern for the aluminum electric wire. That is, in accordance with each of the embodiments of the present invention, it is possible to maintain the contact resistance comparable to that of the combination of the conventional copper electric wire and the conventional connection terminal. Therefore, it is possible to avoid failures including heat generation due to the increase in contact resistance.

Consequently, this allows the same usage/handling as that of the conventional combination of copper electric wires and conventional connection terminals.

INDUSTRIAL APPLICABILITY

The connection terminal according to the present invention used for the aluminum electric wire, the connection device including the connection terminal, the method for manufacturing the connection device, the motor using the connection device, and the compressor using the motor and the blower using the motor, are applicable to the fields of application of electrical apparatus, including compressors and blowers, which employs conventional copper electric wires.

REFERENCE MARKS IN THE DRAWINGS

10, 10A, 10B, 10C, 10D, 10E connection terminal
11 tab part
12, 12C, 12D pinching plate
12A outer pinching plate
12B inner pinching plate
13 first slit
14, 14A, 14B contact surface
15 first open end
16 first tip
17, 117 aluminum electric wire
17A core wire
17B insulating coating
18 effective contact surface
19 contact point
21 temporarily holding part
22 tapered part
23 direction in which pinching plates are arranged
24 contact-resistance increasing region
25 wire-strength decreasing region
30, 30A, 30B connection device
31, 31A, 31B cavity

32, 32A holding part
33, 33A wall surface
33B, 33C inner wall surface
34 second slit
35 second open end
36 second tip
37 opening
38 third slit
39 third tip
40 third open end
41 electric wire mount
42 transverse direction
43 height direction
45, 45A projection (fitting part)
46, 46A recess (to-be-fitted part)
47 line
49 recess (fitting part)
50 projection (to-be-fitted part)
60, 61 center line
70 motor
71 rotary shaft
72 shaft bearing
73 rotor
74 stator
75 magnet
76 core
77 fixing member
78 teeth
80 compressor
81, 91 case
82 compression part
90 blower

The invention claimed is:

1. A connection terminal unit comprising:
a connection terminal; and
an aluminum electric wire comprising a core wire and an insulating coating *for* covering an outer peripheral surface of the core wire, wherein the connection terminal comprises
a tab part; and
at least four pinching plates for holding the aluminum electric wire, wherein each of the pinching plates includes
a first slit having a first open end located in one side and having a first tip located in an other side, the aluminum electric wire being press-fitted into the first slit, and
a contact surface in contact with the aluminum electric wire press-fitted into the first slit, [and]
wherein a *total* contact area between [each] *the contact surface* of the [contact surfaces] *at least four pinching plates* and the core wire is an area of 100% to 200% of a radial cross-sectional area of the core wire,
*the total contact area being a total area of effective contact surfaces at which the contact surface is in contact, relative to the radial cross-sectional area of the core wire, and*
*wherein the first slit includes a temporarily holding part for temporarily holding the aluminum electric wire when the aluminum electric wire is press-fitted.*

[2. The connection terminal unit according to claim 1, wherein the contact surface includes an inclination angle from 15° to 75° relative to a direction of arranging the at least four pinching plates.]

[3. The connection terminal unit according to claim 1, wherein the first slit includes a temporarily holding part for temporarily holding the aluminum electric wire when the aluminum electric wire is press-fitted.]

4. A connection terminal used for an aluminum electric wire including a core wire, and an insulating coating for covering an outer peripheral surface of the core wire, the connection terminal comprising:
a tab part; and
at least four pinching plates[for holding the aluminum electric wire], wherein [each of] the pinching plates [includes] *include*
a first slit having a first open end located in one side and having a first tip located in an other side, the aluminum electric wire being press-fitted into the first slit, and
a contact surface in contact with the aluminum electric wire press-fitted into the first slit,
wherein a *total* contact area between [each] *the contact surface* of the [contact surfaces] *at least four pinching plates* and the core wire is an area of 100% to 200% of a radial cross-sectional area of the core wire, when the at least four pinching plates hold the aluminum electric wire, [and] *the total contact area being a total area of effective contact surfaces at which the contact surface is in contact, relative to the radial cross-sectional area of the core wire,*
wherein the first slit includes a temporarily holding part for temporarily holding the aluminum electric wire when the aluminum electric wire is press-fitted, and
the temporarily holding part includes a recessed part that is formed of taper shaped parts in the first slit.

5. The connection terminal according to claim 4, wherein the contact surface includes an inclination angle from 15° to 75° relative to a direction of arranging the at least four pinching plates.

*6. The connection terminal according to claim 4, wherein*
*the temporarily holding part is located closer to the first open end than the contact surface*
*the recessed part includes two recessed parts, the two recessed parts facing each other in the first slit,*
*each of the two recessed parts is formed of two taper shaped parts, and*
*the taper shaped parts are configured to be located around the aluminum electric wire press-fitted into the first slit to hold the aluminum electric wire.*

*7. A connection terminal unit comprising:*
*a connection terminal; and*
*an aluminum electric wire comprising a core wire and an insulating coating for covering an outer peripheral surface of the core wire, wherein the connection terminal comprises*
*a tab part; and*
*at least four pinching plates for holding the aluminum electric wire, wherein each of the pinching plates includes*
*a first slit having a first open end located in one side and having a first tip located in an other side, the aluminum electric wire being press-fitted into the first slit, and*
*a contact surface in contact with the aluminum electric wire press-fitted into the first slit, and*
*wherein a total contact area between the contact surface of the at least four pinching plates and the core wire is an area of 100% to 200% of a radial cross-sectional area of the core wire,*

*the total contact area being a total area of effective contact surfaces at which the contact surface is in contact, relative to the radial cross-sectional area of the core wire, and*

*wherein the first slit includes a temporarily holding part for temporarily holding the aluminum electric wire when the aluminum electric wire is press-fitted,*

*the temporarily holding part is located closer to the first open end than the contact surface,*

*the temporarily holding part includes two recessed parts in the first slit, the two recessed parts facing each other in the first slit,*

*each of the two recessed parts is formed of two taper shaped parts, and*

*the taper shaped parts are configured to be located around the aluminum electric wire press-fitted into the first slit to hold the aluminum electric wire.*

*8. The connection terminal unit according to claim 7, wherein the contact surface includes an inclination angle from 15° to 75° relative to a direction of arranging the at least four pinching plates.*

* * * * *